(12) United States Patent
Yerramalli et al.

(10) Patent No.: US 12,717,016 B2
(45) Date of Patent: Aug. 25, 2026

(54) FREQUENCY MODULATED CONTINUOUS WAVE SIGNAL-BASED POSITIONING IN NEW RADIO

(71) Applicant: QUALCOMM Incorporated, San Diego, CA (US)

(72) Inventors: Srinivas Yerramalli, San Diego, CA (US); Xiaoxia Zhang, San Diego, CA (US); Taesang Yoo, San Diego, CA (US); Rajat Prakash, San Diego, CA (US); Marwen Zorgui, San Diego, CA (US); Mohammed Ali Mohammed Hirzallah, San Diego, CA (US); Roohollah Amiri, San Diego, CA (US); Mohammad Tarek Fahim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 512 days.

(21) Appl. No.: 17/660,945

(22) Filed: Apr. 27, 2022

(65) Prior Publication Data

US 2023/0350045 A1 Nov. 2, 2023

(51) Int. Cl.
*G01S 13/34* (2006.01)
*G01S 7/35* (2006.01)
(Continued)

(52) U.S. Cl.
CPC .............. *G01S 13/34* (2013.01); *G01S 7/352* (2013.01); *G01S 13/536* (2013.01); *G01S 13/56* (2013.01)

(58) Field of Classification Search
CPC ........ G01S 13/34; G01S 13/56; G01S 13/536; G01S 13/765; G01S 13/931;
(Continued)

(56) References Cited

U.S. PATENT DOCUMENTS 3,351,942 A 11/1967 Sodano
6,029,121 A * 2/2000 Stashko ................ A63B 57/00 702/158

(Continued)

FOREIGN PATENT DOCUMENTS

WO 2021252377 12/2021

OTHER PUBLICATIONS

International Search Report and Written Opinion—PCT/US2023/063829—ISA/EPO—Jun. 12, 2023.

(Continued)

*Primary Examiner* — Michael W Justice
(74) *Attorney, Agent, or Firm* — Muncy, Geissler, Olds & Lowe, P.C / QUALCOMM Incorporated

(57) ABSTRACT

Disclosed are techniques for wireless positioning. In an aspect, a user equipment (UE) may send, to a network entity, information identifying a capability of the UE to process frequency modulated continuous wave (FMCW) signals. The UE may receive, from a network entity, information identifying a set of transmission/reception points (TRPs) for transmitting FMCW signals for a positioning measurement, the set comprising at least a first TRP and a second TRP. The UE may measure a first FMCW signal that was transmitted by the first TRP to produce a first frequency of arrival. The UE may measure a second FMCW signal that was transmitted by the second TRP to produce a second frequency of arrival. The UE may determine a location of the UE based on a frequency difference between the first frequency of arrival and the second frequency of arrival.

30 Claims, 12 Drawing Sheets

(51) Int. Cl.
*G01S 13/536* (2006.01)
*G01S 13/56* (2006.01)

(58) Field of Classification Search
CPC ........... G01S 13/003; G01S 2013/9316; G01S 5/0236; G01S 5/0036; G01S 5/0205; G01S 5/0009; H04W 64/00; H04W 64/003; H04W 64/006; H04W 24/10; H04W 4/029; H04W 4/40; H04W 4/44; H04W 4/46; H04L 5/0048; H04L 5/0035; H04L 5/001
USPC ........... 342/70, 59, 173; 455/456.1; 370/252
See application file for complete search history.

(56) References Cited

U.S. PATENT DOCUMENTS 7,580,710 B2 * 8/2009 Katz ...................... G01C 21/20 455/445
7,884,760 B2 * 2/2011 Boiero .................... G01S 19/50 342/357.63
8,160,188 B2 * 4/2012 Mudulodu .......... H04L 27/2647 375/347
8,553,819 B2 * 10/2013 Mudulodu .......... H04L 27/2647 375/347
8,629,802 B2 * 1/2014 Boiero .................... G01S 19/50 342/357.29
8,686,893 B2 * 4/2014 Watanabe ............... G01S 13/34 342/108
9,520,250 B2 * 12/2016 O'Keeffe ................. H01H 9/02
9,661,604 B1 * 5/2017 O'Shea ................. G01S 5/0252
9,733,337 B2 * 8/2017 Edge ..................... G01S 5/0236
9,778,355 B2 * 10/2017 Li .......................... G01S 13/58
9,853,365 B2 * 12/2017 Kumar Y. B ......... G01S 13/343
9,921,295 B2 * 3/2018 Altus ........................ G01S 7/35
9,971,028 B2 * 5/2018 Park ...................... G01S 13/345
10,154,048 B2 * 12/2018 Krishnamurthi ...... H04W 4/023
10,338,189 B2 * 7/2019 O'Shea ................... G01S 1/022
10,454,644 B2 * 10/2019 Manolakos ......... H04W 72/044
10,484,999 B2 * 11/2019 Agarwal ............... H04W 72/51
10,506,376 B2 * 12/2019 Markhovsky ........... G01S 5/011
10,567,905 B2 * 2/2020 Edge ......................... G01S 5/10
10,627,473 B2 * 4/2020 Park ........................ H04L 25/02
10,739,436 B2 * 8/2020 O'Shea ................. G01S 5/0036
10,779,126 B2 * 9/2020 Kumar .................. H04W 4/029
10,845,453 B2 * 11/2020 Markhovsky ......... G01S 13/765
10,848,286 B2 * 11/2020 Manolakos ........... H04L 5/0044
10,966,209 B2 * 3/2021 Edge ....................... H04W 4/02
11,085,990 B2 * 8/2021 Park ........................ H04L 25/02
11,269,049 B2 * 3/2022 Wu ......................... G01S 13/42
11,280,876 B2 * 3/2022 Gulati ..................... G01S 7/006
11,438,203 B2 * 9/2022 Lee ..................... H04L 27/2602
11,442,135 B2 * 9/2022 Akkarakaran ........ H04W 24/10
11,681,038 B2 * 6/2023 Izadian ................. G01S 7/0235 342/173
12,461,232 B2 * 11/2025 Herbertsson ............ G01S 7/006
2007/0103363 A1 * 5/2007 Boiero .................... G01S 19/50 342/357.29
2010/0158139 A1 * 6/2010 Mudulodu .......... H04L 27/2647 375/260
2010/0171657 A1 * 7/2010 Liu ....................... G01S 5/0289 342/357.29
2011/0128184 A1 * 6/2011 Boiero .................... G01S 19/50 342/357.31
2012/0127016 A1 * 5/2012 Watanabe ............... G01S 13/34 342/146
2012/0201281 A1 * 8/2012 Mudulodu .......... H04L 27/2647 375/219
2015/0276929 A1 * 10/2015 Li .......................... G01S 13/58 342/112
2016/0088438 A1 * 3/2016 O'Keeffe ................ H04W 4/21 455/456.2
2016/0187462 A1 * 6/2016 Altus ........................ G01S 7/35 342/175
2016/0327633 A1 * 11/2016 Kumar Y.B ............... G01S 7/35
2017/0059689 A1 * 3/2017 Edge ..................... G01S 5/0289
2017/0227623 A1 * 8/2017 Park .......................... G01S 3/46
2017/0272450 A1 * 9/2017 Krishnamurthi ........ G06F 21/35
2018/0007653 A1 * 1/2018 O'Shea ................. G01S 5/0252
2018/0092083 A1 * 3/2018 Agarwal ............... H04W 60/04
2018/0206109 A1 * 7/2018 Bitra ....................... H04W 4/02
2018/0278384 A1 * 9/2018 Manolakos ......... H04W 72/044
2018/0295470 A1 * 10/2018 Markhovsky ......... H04L 5/0048
2018/0321368 A1 * 11/2018 Bharadwaj ............ G01S 13/931
2019/0120928 A1 * 4/2019 O'Shea ..................... G01S 1/04
2019/0166453 A1 * 5/2019 Edge ......................... G01S 5/06
2019/0285722 A1 * 9/2019 Markhovsky ........... G01S 1/042
2019/0324110 A1 * 10/2019 O'Shea ................. G01S 5/0246
2019/0369201 A1 * 12/2019 Akkarakaran ............ G01S 5/10
2019/0379495 A1 * 12/2019 Manolakos ........... H04L 5/0053
2019/0383925 A1 * 12/2019 Gulati ................... G01S 13/341
2020/0021946 A1 * 1/2020 Kumar .................. G01S 1/0428
2020/0049808 A1 * 2/2020 Bialer ................... G01S 13/931
2020/0196298 A1 * 6/2020 Edge ......................... G01S 5/12
2020/0229124 A1 * 7/2020 Soriaga ............... H04L 43/0864
2020/0300965 A1 * 9/2020 Wu ....................... G01S 13/505
2020/0386844 A1 * 12/2020 Park .......................... G01S 3/18
2021/0281455 A1 * 9/2021 Lee ..................... H04L 27/0008
2023/0040147 A1 * 2/2023 Herbertsson ............ G01S 7/023
2023/0367005 A1 * 11/2023 Hwang ................... G01S 13/58

OTHER PUBLICATIONS

Liu L., et al., "Improve the Positioning Accuracy for Wireless Sensor Nodes Based on TFDA and TFOA Using Data Fusion", Networking, Sensing and Control (ICNSC), 2010 International Conference on, IEEE, Piscataway, NJ, USA, Apr. 10, 2010, pp. 32-37, XP031674553, ISBN: 978-1-4244-6450-0, Sections II and 3, p. 33, Figures 1-3.

* cited by examiner

FREQUENCY MODULATED CONTINUOUS WAVE SIGNAL-BASED POSITIONING IN NEW RADIO

BACKGROUND OF THE DISCLOSURE

1. Field of the Disclosure

Aspects of the disclosure relate generally to wireless positioning.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (RS-P), such as downlink, uplink, or sidelink positioning reference signals (PRS)), and other technical enhancements. These enhancements, as well as the use of higher frequency bands, advances in PRS processes and technology, and high-density deployments for 5G, enable highly accurate 5G-based positioning.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless positioning performed by a user equipment (UE) includes sending, to a network entity, information identifying a capability of the UE to process frequency modulated continuous wave (FMCW) signals; receiving, from a network entity, information identifying a set of transmission/reception points (TRPs) for transmitting FMCW signals for a positioning measurement, the set comprising at least a first TRP and a second TRP; measuring a first FMCW signal that was transmitted by the first TRP to produce a first frequency of arrival; measuring a second FMCW signal that was transmitted by the second TRP to produce a second frequency of arrival; and determining a location of the UE based on a frequency difference between the first frequency of arrival and the second frequency of arrival.

In an aspect, a method of wireless positioning performed by a network entity includes identifying a set of TRPs for transmitting FMCW signals for a positioning measurement, the set comprising at least a first TRP and a second TRP; receiving, from a UE, information identifying a capability of the UE to process FMCW signals; and sending, to the UE, information identifying the set of TRPs and identifying FMCW signals to be transmitted by each TRP in the set of TRPs.

In an aspect, a UE includes a memory; at least one transceiver; and at least one processor communicatively coupled to the memory and the at least one transceiver, the at least one processor configured to: send, via the at least one transceiver, to a network entity, information identifying a capability of the UE to process FMCW signals; receive, via the at least one transceiver, from a network entity, information identifying a set of TRPs for transmitting FMCW signals for a positioning measurement, the set comprising at least a first TRP and a second TRP; measure a first FMCW signal that was transmitted by the first TRP to produce a first frequency of arrival; measure a second FMCW signal that was transmitted by the second TRP to produce a second frequency of arrival; and determine a location of the UE based on a frequency difference between the first frequency of arrival and the second frequency of arrival.

In an aspect, a network entity includes a memory; at least one transceiver; and at least one processor communicatively coupled to the memory and the at least one transceiver, the at least one processor configured to: identify a set of TRPs for transmitting FMCW signals for a positioning measurement, the set comprising at least a first TRP and a second TRP; receive, via the at least one transceiver, from a UE, information identifying a capability of the UE to process FMCW signals; and send, via the at least one transceiver, to the UE, information identifying the set of TRPs and identifying FMCW signals to be transmitted by each TRP in the set of TRPs.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
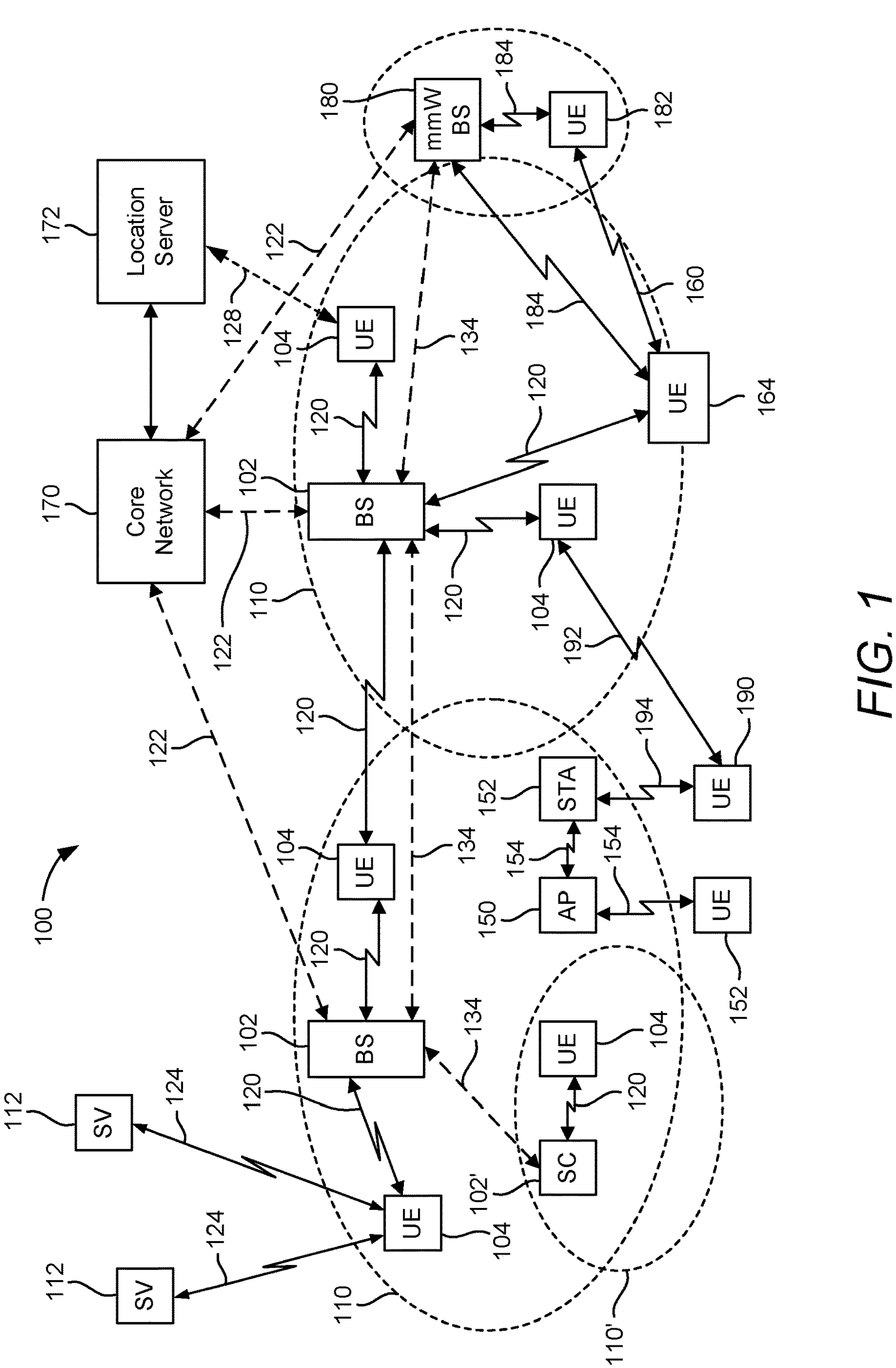
FIG. 1 illustrates an example wireless communications system, according to aspects of the disclosure.

Disclosed are techniques for wireless positioning. In an aspect, a user equipment (UE) may send, to a network entity, information identifying a capability of the UE to process frequency modulated continuous wave (FMCW) signals. The UE may receive, from a network entity, information identifying a set of transmission/reception points (TRPs) for transmitting FMCW signals for a positioning measurement, the set comprising at least a first TRP and a second TRP. The UE may measure a first FMCW signal that was transmitted by the first TRP to produce a first frequency of arrival. The UE may measure a second FMCW signal that was transmitted by the second TRP to produce a second frequency of arrival. The UE may determine a location of the UE based on a frequency difference between the first frequency of arrival and the second frequency of arrival.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An “RF signal” comprises an electromagnetic wave of a given frequency that transports information through the space between a transmitter and a receiver. As used herein, a transmitter may transmit a single “RF signal” or multiple “RF signals” to a receiver. However, the receiver may receive multiple “RF signals” corresponding to each transmitted RF signal due to the propagation characteristics of RF signals through multipath channels. The same transmitted RF signal on different paths between the transmitter and receiver may be referred to as a “multipath” RF signal. As used herein, an RF signal may also be referred to as a “wireless signal” or simply a “signal” where it is clear from the context that the term “signal” refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled “BS”) and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A “cell” is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term “cell” may refer to either or both of the logical communication entity and the base station that supports it, depending on the context. In addition, because a TRP is typically the physical transmission point of a cell, the terms “cell” and “TRP” may be used interchangeably. In some cases, the term “cell” may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled “SC” for “small cell”) may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen-before-talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In some cases, the UE 164 and the UE 182 may be capable of sidelink communication. Sidelink-capable UEs (SL-UEs) may communicate with base stations 102 over communication links 120 using the Uu interface (i.e., the air interface between a UE and a base station). SL-UEs (e.g., UE 164, UE 182) may also communicate directly with each other over a wireless sidelink 160 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, vehicle-to-vehicle (V2V) communication, vehicle-to-everything (V2X) communication (e.g., cellular V2X (cV2X) communication, enhanced V2X (eV2X) communication, etc.), emergency rescue applications, etc. One or more of a group of SL-UEs utilizing sidelink communications may be within the geographic coverage area 110 of a base station 102. Other SL-UEs in such a group may be outside the geographic coverage area 110 of a base station 102 or be otherwise unable to receive transmissions from a base station 102. In some cases, groups of SL-UEs communicating via sidelink communications may utilize a one-to-many (1:M) system in which each SL-UE transmits to every other SL-UE in the group. In some cases, a base station 102 facilitates the scheduling of resources for sidelink communications. In other cases, sidelink communications are carried out between SL-UEs without the involvement of a base station 102.

In an aspect, the sidelink 160 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs. In an aspect, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Note that although FIG. 1 only illustrates two of the UEs as SL-UEs (i.e., UEs 164 and 182), any of the illustrated UEs may be SL-UEs. Further, although only UE 182 was described as being capable of beamforming, any of the illustrated UEs, including UE 164, may be capable of beamforming. Where SL-UEs are capable of beamforming, they may beamform towards each other (i.e., towards other SL-UEs), towards other UEs (e.g., UEs 104), towards base stations (e.g., base stations 102, 180, small cell 102', access point 150), etc. Thus, in some cases, UEs 164 and 182 may utilize beamforming over sidelink 160.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
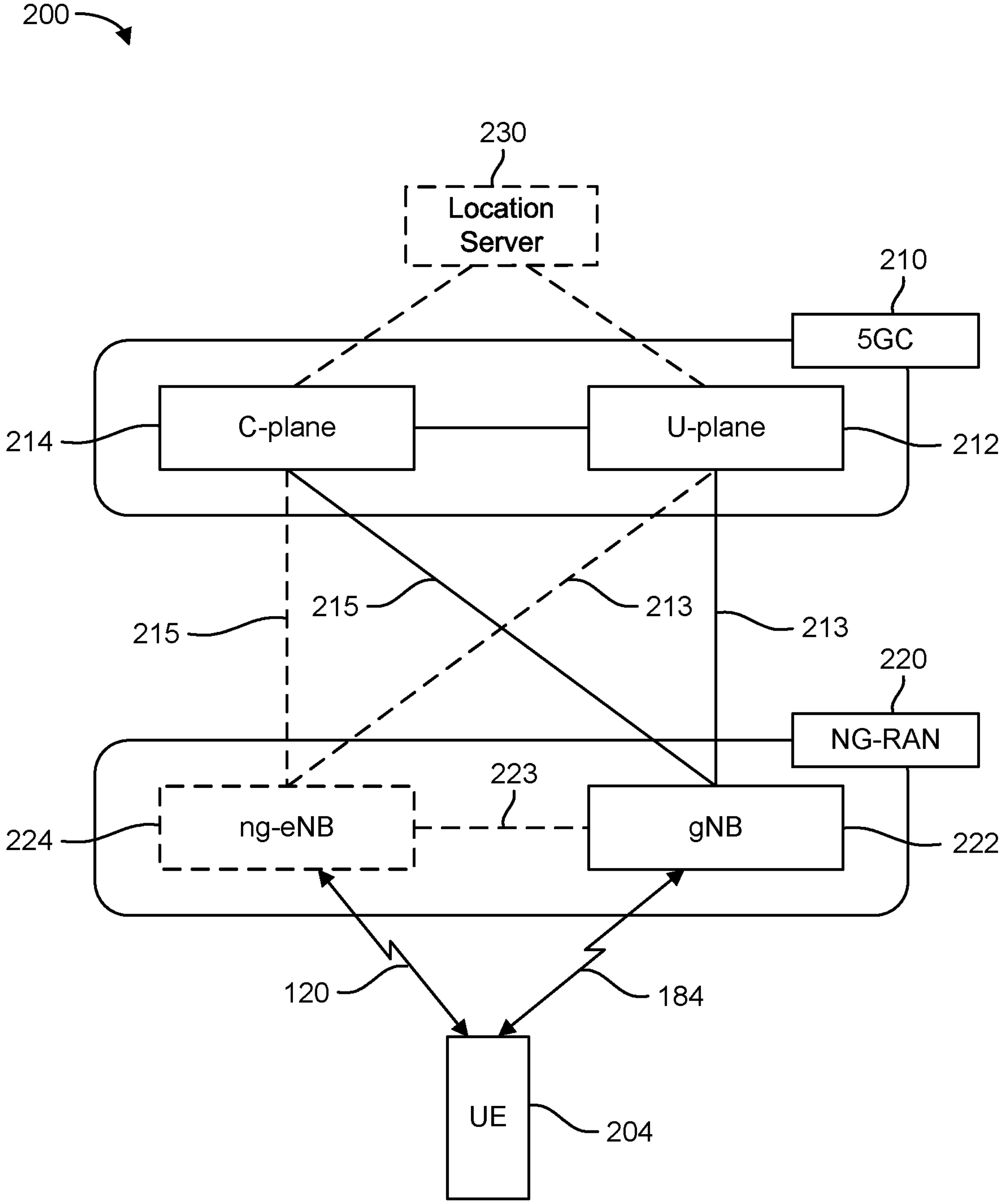
FIGS. 2A, 2B, and 2C illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
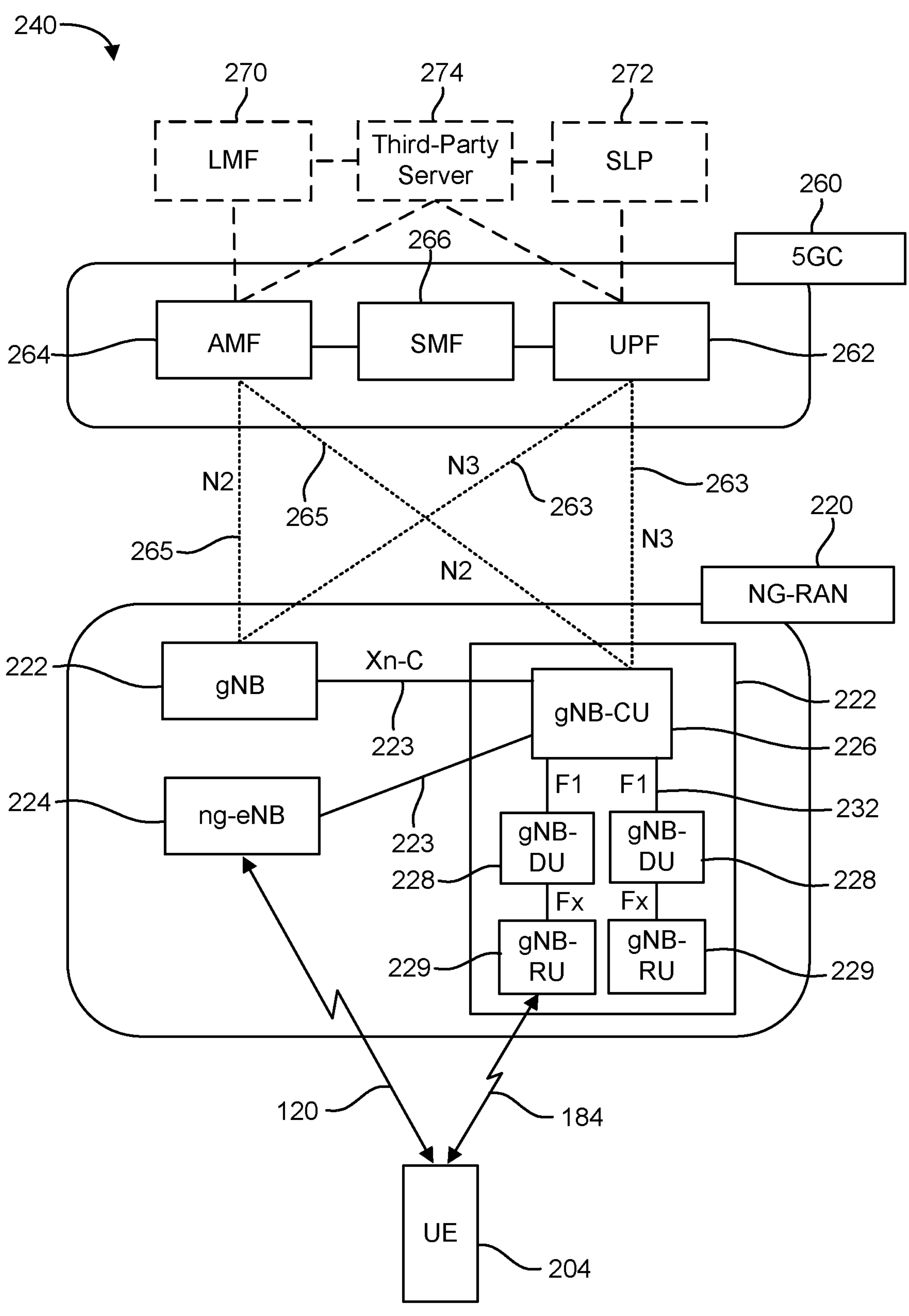

FIG. 2B illustrates another example wireless network structure 240. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface.

The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station, or one or more units (or one or more components) performing base station functionality, may be implemented in an aggregated or disaggregated architecture. For example, a base station (such as a Node B (NB), evolved NB (eNB), NR base station, 5G NB, access point (AP), a transmit receive point (TRP), or a cell, etc.) may be implemented as an aggregated base station (also known as a standalone base station or a monolithic base station) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 2C:
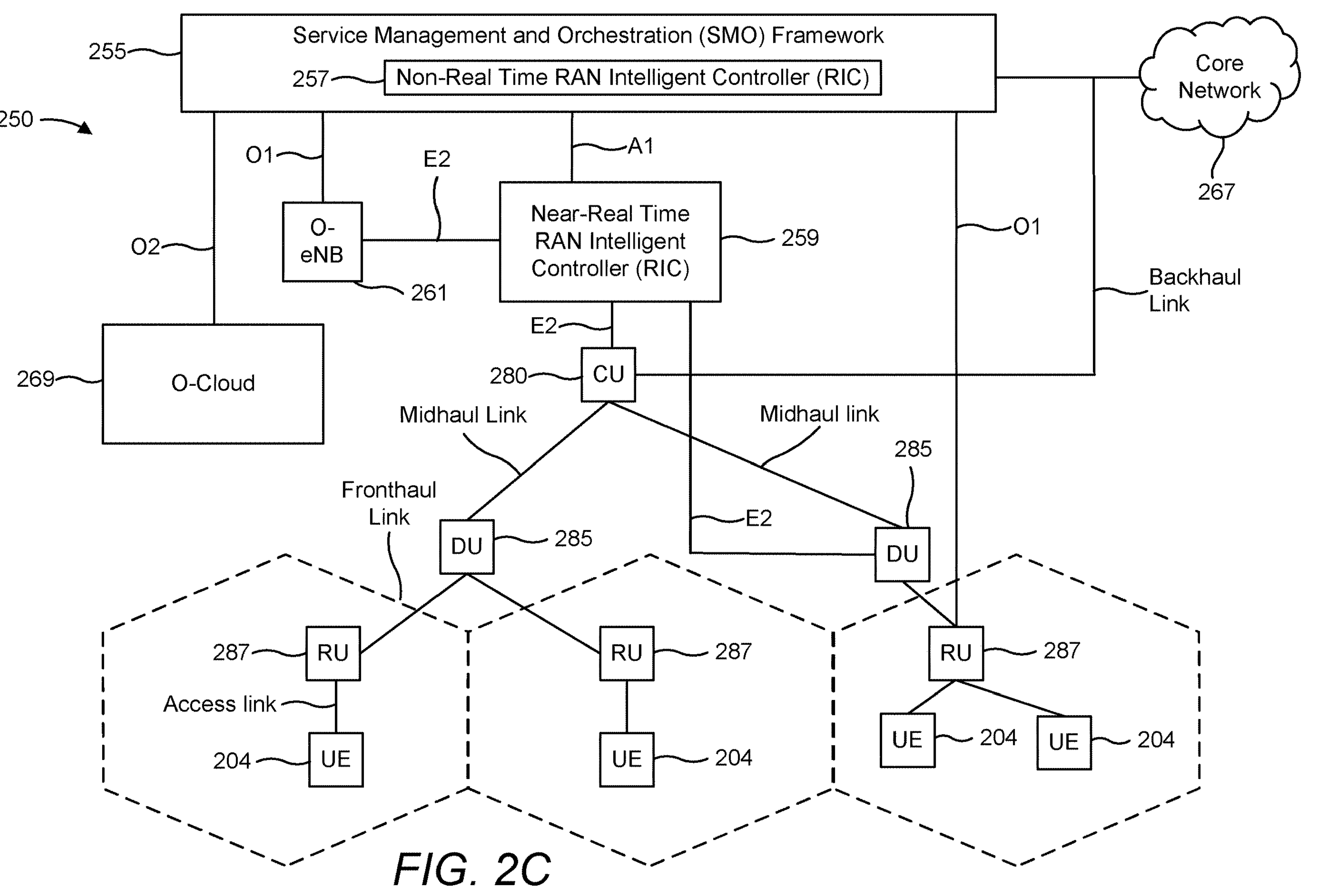

FIG. 2C illustrates an example disaggregated base station architecture 250, according to aspects of the disclosure. The disaggregated base station architecture 250 may include one or more central units (CUs) 280 (e.g., gNB-CU 226) that can communicate directly with a core network 267 (e.g., 5GC 210, 5GC 260) via a backhaul link, or indirectly with the core network 267 through one or more disaggregated base station units (such as a Near-Real Time (Near-RT) RAN Intelligent Controller (RIC) 259 via an E2 link, or a Non-Real Time (Non-RT) RIC 257 associated with a Service Management and Orchestration (SMO) Framework 255, or both). A CU 280 may communicate with one or more distributed units (DUs) 285 (e.g., gNB-DUs 228) via respective midhaul links, such as an F1 interface. The DUs 285 may communicate with one or more radio units (RUs) 287 (e.g., gNB-RUs 229) via respective fronthaul links. The RUs 287 may communicate with respective UEs 204 via one or more radio frequency (RF) access links. In some implementations, the UE 204 may be simultaneously served by multiple RUs 287.

Each of the units, i.e., the CUs 280, the DUs 285, the RUs 287, as well as the Near-RT RICs 259, the Non-RT RICs 257 and the SMO Framework 255, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 280 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 280. The CU 280 may be configured to handle user plane functionality (i.e., Central Unit—User Plane (CU-UP)), control plane functionality (i.e., Central Unit—Control Plane (CU-CP)), or a combination thereof. In some implementations, the CU 280 can be logically split into one or more CU-UP units and one or more CU-CP units. The CU-UP unit can communicate bidirectionally with the CU-CP unit via an interface, such as the E1 interface when implemented in an O-RAN configuration. The CU 280 can be implemented to communicate with the DU 285, as necessary, for network control and signaling.

The DU 285 may correspond to a logical unit that includes one or more base station functions to control the operation of one or more RUs 287. In some aspects, the DU 285 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 285 may further host one or more low PHY layers. Each layer (or module) can be implemented with an interface configured to communicate signals with other layers (and modules) hosted by the DU 285, or with the control functions hosted by the CU 280.

Lower-layer functionality can be implemented by one or more RUs 287. In some deployments, an RU 287, controlled by a DU 285, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 287 can be implemented to handle over the air (OTA) communication with one or more UEs 204. In some implementations, real-time and non-real-time aspects of control and user plane communication with the RU(s) 287 can be controlled by the corresponding DU 285. In some scenarios, this configuration can enable the DU(s) 285 and the CU 280 to be implemented in a cloud-based RAN architecture, such as a vRAN architecture.

The SMO Framework 255 may be configured to support RAN deployment and provisioning of non-virtualized and virtualized network elements. For non-virtualized network elements, the SMO Framework 255 may be configured to support the deployment of dedicated physical resources for RAN coverage requirements which may be managed via an operations and maintenance interface (such as an O1 interface). For virtualized network elements, the SMO Framework 255 may be configured to interact with a cloud computing platform (such as an open cloud (O-Cloud) 269) to perform network element life cycle management (such as to instantiate virtualized network elements) via a cloud computing platform interface (such as an O2 interface). Such virtualized network elements can include, but are not limited to, CUs 280, DUs 285, RUs 287 and Near-RT RICs 259. In some implementations, the SMO Framework 255 can communicate with a hardware aspect of a 4G RAN, such as an open eNB (O-eNB) 261, via an O1 interface. Additionally, in some implementations, the SMO Framework 255 can communicate directly with one or more RUs 287 via an O1 interface. The SMO Framework 255 also may include a Non-RT RIC 257 configured to support functionality of the SMO Framework 255.

The Non-RT RIC 257 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 259. The Non-RT RIC 257 may be coupled to or communicate with (such as via an AI interface) the Near-RT RIC 259. The Near-RT RIC 259 may be configured to include a logical function that enables near-real-time control and optimization of RAN elements and resources via data collection and actions over an interface (such as via an E2 interface) connecting one or more CUs 280, one or more DUs 285, or both, as well as an O-eNB, with the Near-RT RIC 259.

In some implementations, to generate AI/ML models to be deployed in the Near-RT RIC 259, the Non-RT RIC 257 may receive parameters or external enrichment information from external servers. Such information may be utilized by the Near-RT RIC 259 and may be received at the SMO Framework 255 or the Non-RT RIC 257 from non-network data sources or from network functions. In some examples, the Non-RT RIC 257 or the Near-RT RIC 259 may be configured to tune RAN behavior or performance. For example, the Non-RT RIC 257 may monitor long-term trends and patterns for performance and employ AI/ML models to perform corrective actions through the SMO Framework 255 (such as reconfiguration via 01) or via creation of RAN management policies (such as AI policies).

Figure 3A:
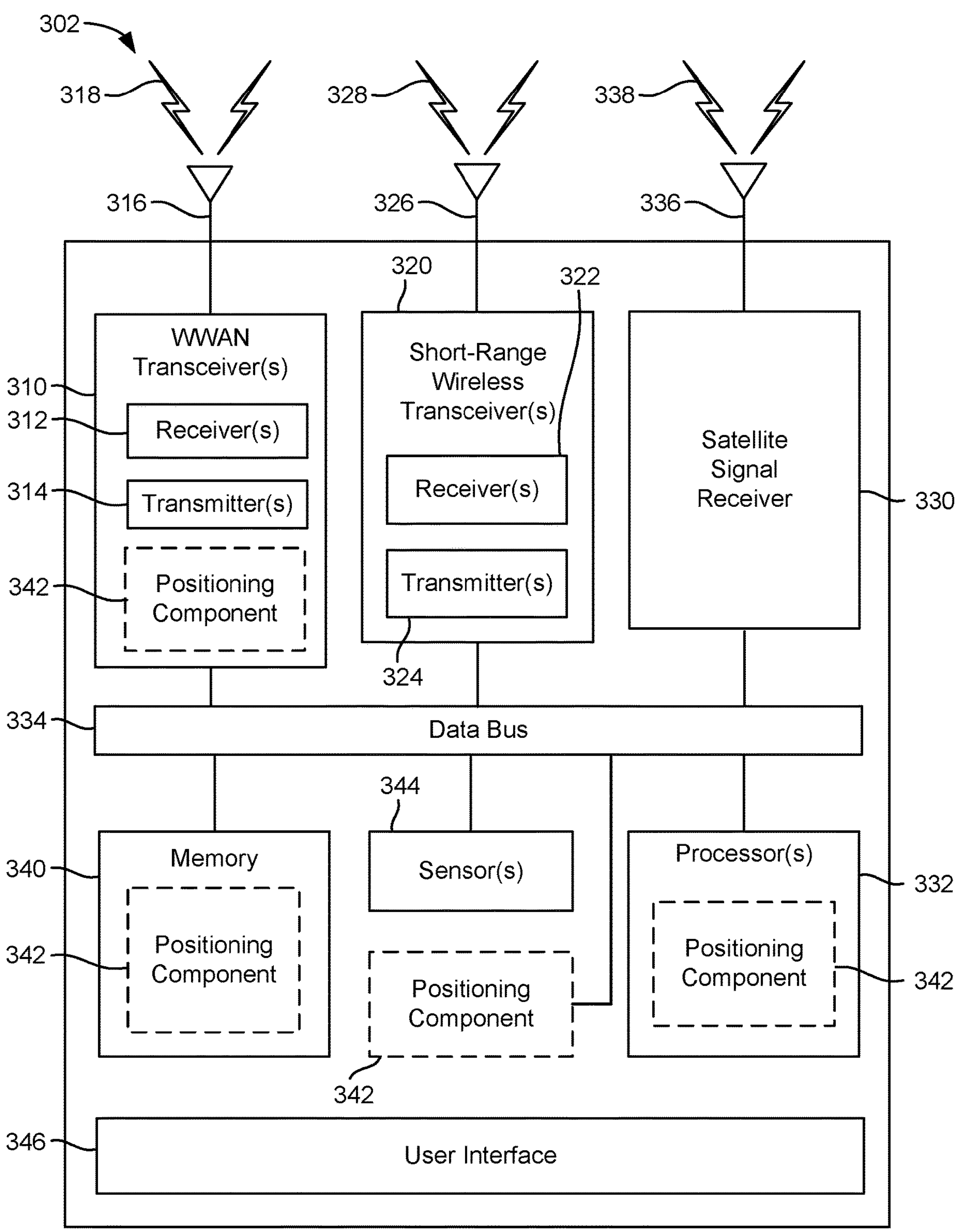
FIGS. 3A, 3B, and 3C are simplified block diagrams of several sample aspects of components that may be employed in a user equipment (UE), a base station, and a network entity, respectively, and configured to support communications as taught herein.
Figure 3B:
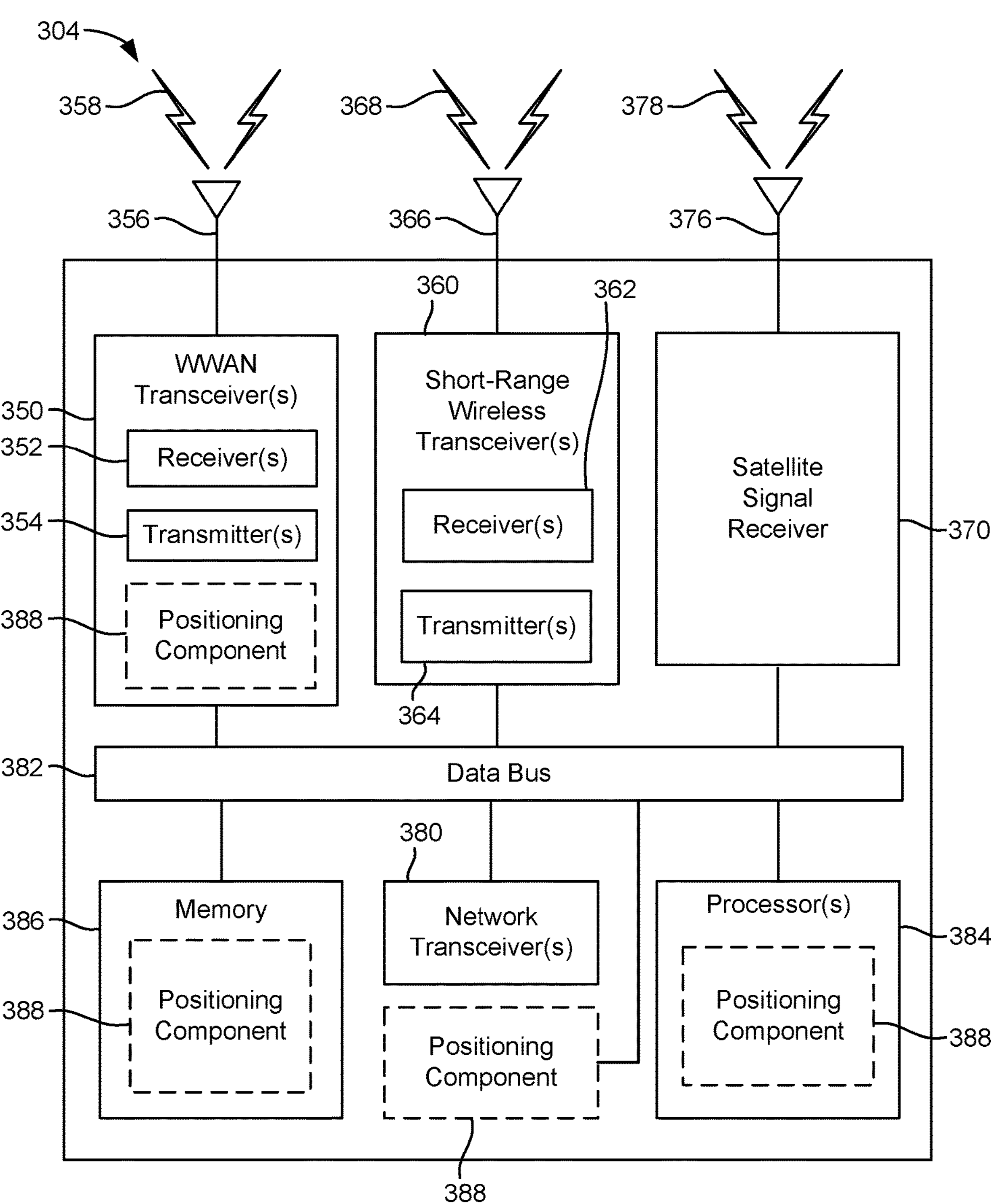
Figure 3C:
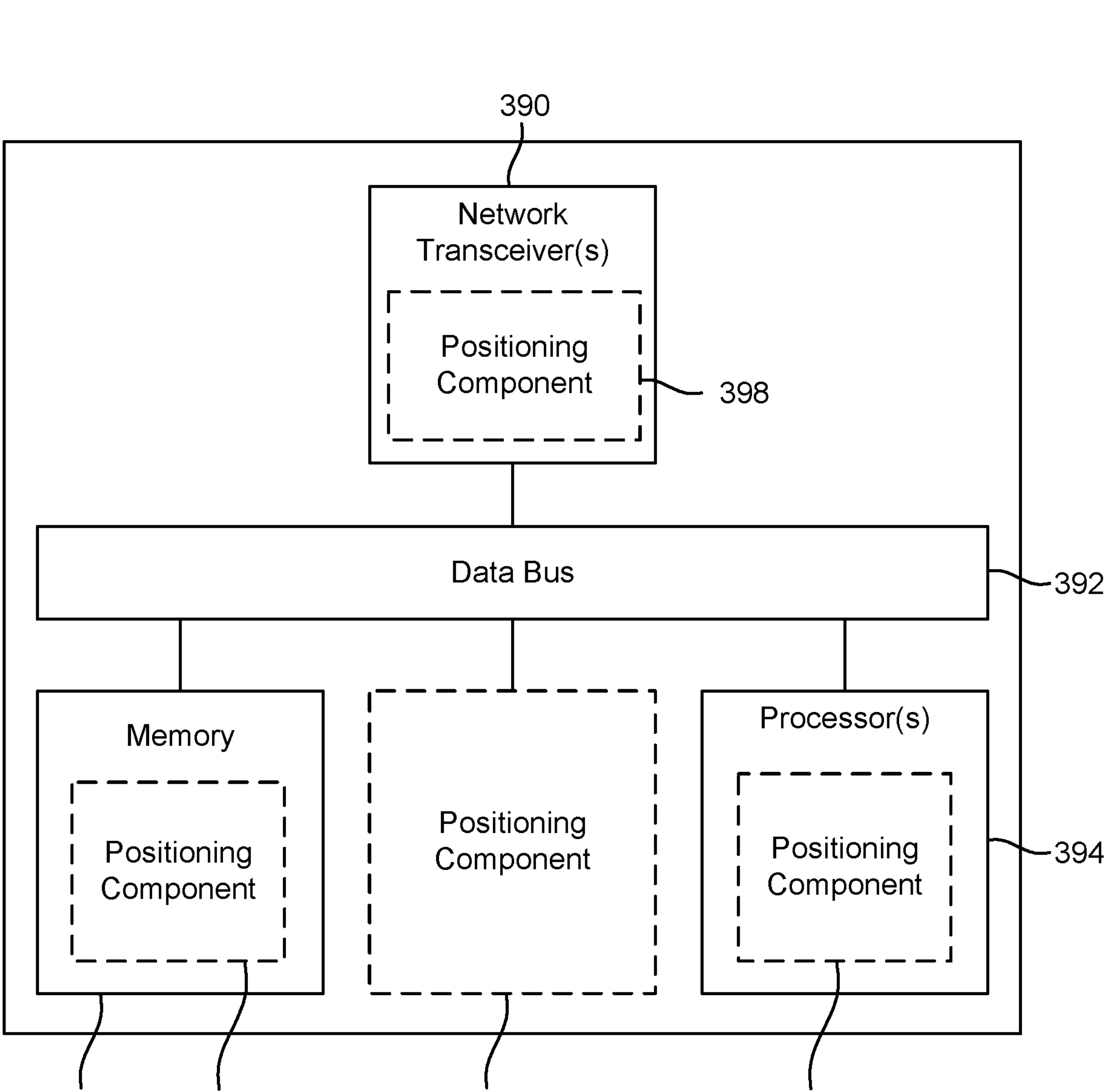

FIG. 3A, FIG. 3B, and FIG. 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the operations described herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), ultra-wideband (UWB), etc.) over a wireless communication medium of interest. The short-range wireless transceivers 320 and 360 may be variously configured for transmitting and encoding signals 328 and 368 (e.g., messages, indications, information, and so on), respectively, and conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, UWB transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include positioning component 342, 388, and 398, respectively. The positioning component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the positioning component 342, 388, and 398 may be external to the processors 332, 384, and 394 (e.g., part of a modem processing system, integrated with another processing system, etc.). Alternatively, the positioning component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the positioning component 342, which may be, for example, part of the one or more WWAN transceivers 310, the memory 340, the one or more processors 332, or any combination thereof, or may be a standalone component. FIG. 3B illustrates possible locations of the positioning component 388, which may be, for example, part of the one or more WWAN transceivers 350, the memory 386, the one or more processors 384, or any combination thereof, or may be a standalone component. FIG. 3C illustrates possible locations of the positioning component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver (s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the positioning component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Wireless communication signals (e.g., RF signals configured to carry OFDM symbols) transmitted between a UE and a base station can be reused for environment sensing (also referred to as "RF sensing" or "radar"). Using wireless communication signals for environment sensing can be regarded as consumer-level radar with advanced detection capabilities that enable, among other things, touchless/device-free interaction with a device/system. The wireless communication signals may be cellular communication signals, such as LTE or NR signals, WLAN signals, etc. As a particular example, the wireless communication signals may be an OFDM waveform as utilized in LTE and NR. High-frequency communication signals, such as mmW RF signals, are especially beneficial to use as radar signals because the higher frequency provides, at least, more accurate range (distance) detection.

Figure 4A:
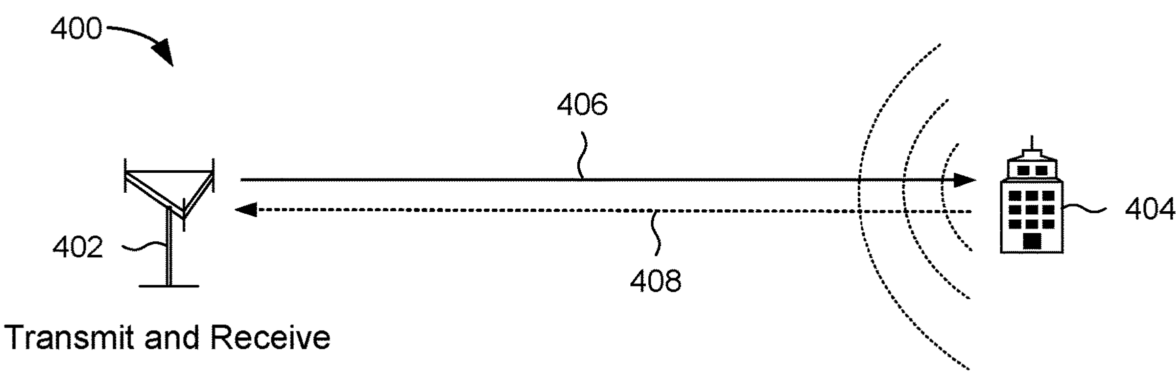
FIG. 4A illustrates an example monostatic radar system.
Figure 4B:
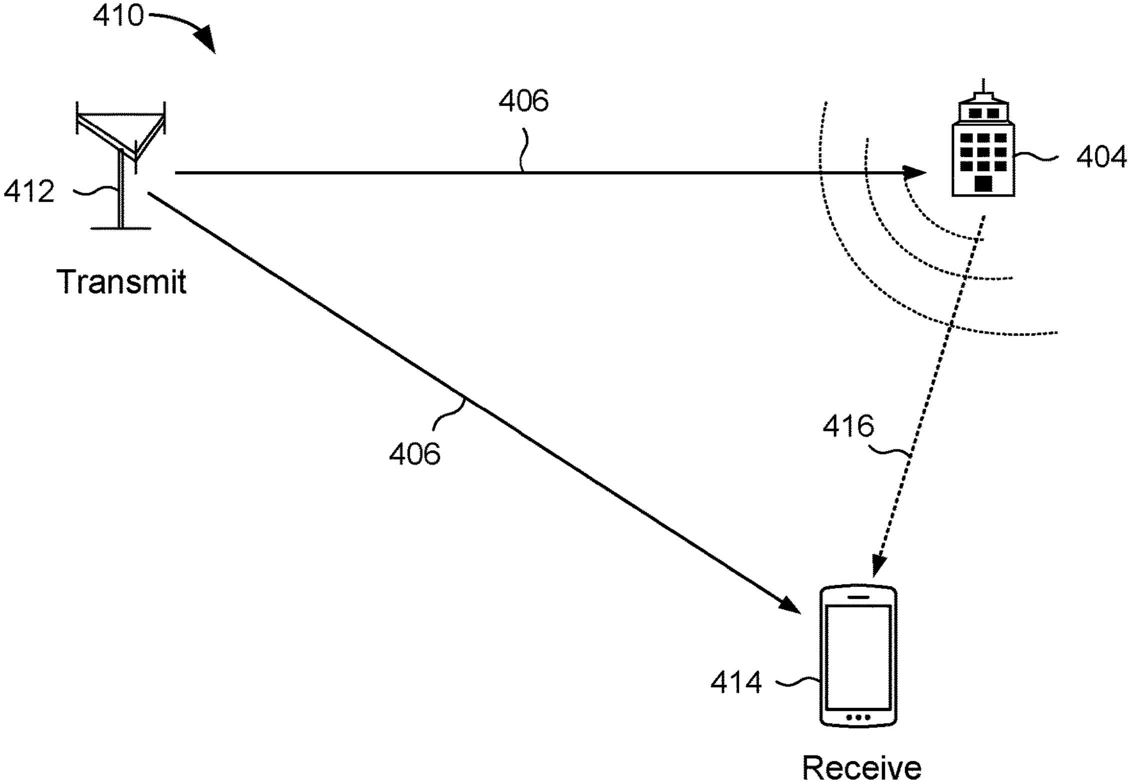
FIG. 4B illustrates an example bistatic radar system.

FIG. 4A and FIG. 4B illustrate two of these various types of radar. In general, there are different types of radar, and in particular, monostatic and bistatic radars. Specifically, FIG. 4A is a diagram 400 illustrating a monostatic radar scenario, and FIG. 4B is a diagram 410 illustrating a bistatic radar scenario.

In FIG. 4A, a base station 402 may be configured for full duplex operation and thus the transmitter (Tx) and receiver (Rx) are co-located. For example, a transmitted radio signal 406 may be reflected off of a target object, such as a building 404, and the receiver on the base station 402 is configured to receive and measure a reflected beam 408. This is a typical use case for traditional, or conventional, radar.

In FIG. 4B, a base station 412 may be configured as a transmitter (Tx) and a UE 414 may be configured as a receiver (Rx). In this example, the transmitter and the receiver are not co-located, that is, they are separated, e.g., by a distance that is comparable to the expected target distance. The base station 412 may be configured to transmit a beam, such as an omnidirectional downlink RF signal 406 which may be received by the UE 414. A portion of the RF signal 406 may be reflected or refracted by the building 404 and the UE 414 may receive this reflected signal 416. This is the typical use case for wireless communication-based (e.g., WiFi-based, LTE-based, NR-based) RF sensing. Note that while FIG. 4B illustrates using a downlink RF signal 406 as a RF sensing signal, uplink RF signals can also be used as RF sensing signals. In a downlink scenario, as shown, the transmitter is the base station 412 and the receiver is the UE 414, whereas in an uplink scenario, the transmitter is a UE and the receiver is a base station. A multistatic radar system is a generalization of the bistatic radar system, which includes at least three components, e.g., one receiver and two transmitters, two receivers and one transmitter, or multiple receivers and multiple transmitters.

Referring to FIG. 4B in greater detail, the base station 412 transmits RF sensing signals (e.g., PRS) to the UE 414, but some of the RF sensing signals reflect off a target object such as the building 404. The UE 414 can measure the ToAs of the RF signal 406 received directly from the base station, and the ToAs of the reflected signal 416 which is reflected from the target object (e.g., the building 404).

The base station 412 may be configured to transmit the single RF signal 406 or multiple RF signals to a receiver (e.g., the UE 414). However, the UE 414 may receive multiple RF signals corresponding to each transmitted RF signal due to the propagation characteristics of RF signals through multipath channels. Each path may be associated with a cluster of one or more channel taps. Generally, the time at which the receiver detects the first cluster of channel taps is considered the ToA of the RF signal on the line-of-site (LOS) path (i.e., the shortest path between the transmitter and the receiver). Later clusters of channel taps are considered to have reflected off objects between the transmitter and the receiver and therefore to have followed non-LOS (NLOS) paths between the transmitter and the receiver.

Thus, referring back to FIG. 4B, the RF signal 406 follows a LOS path between the base station 412 and the UE 414, and the reflected signal 416 represents the RF sensing signals that followed a NLOS path between the base station 412 and the UE 414 due to reflecting off the building 404 (or another target object). The base station 412 may have transmitted multiple RF sensing signals (not shown in FIG. 4B), some of which followed the LOS path and others of which followed the NLOS path. Alternatively, the base station 412 may have transmitted a single RF sensing signal in a broad enough beam that a portion of the RF sensing signal followed the LOS path and a portion of the RF sensing signal followed the NLOS path.

Based on the difference between the ToA of the LOS path, the ToA of the NLOS path, and the speed of light, the UE 414 can determine the distance to the building 404. In addition, if the UE 414 is capable of receive beamforming, the UE 414 may be able to determine the general direction to the building 404 as the direction of the reflected signal 416, which is the RF sensing signal following the NLOS path as received. The UE 414 may then optionally report this information to the transmitting base station 412, an application server associated with the core network, an external client, a third-party application, or some other entity. Alternatively, the UE 414 may report the ToA measurements to the base station 412, or other entity, and the base station 412 may determine the distance and, optionally, the direction to the target object.

Note that if the RF sensing signals are uplink RF signals transmitted by the UE 414 to the base station 412, the base station 412 would perform object detection based on the uplink RF signals just like the UE 414 does based on the downlink RF signals.

Integrated sensing and communication (ISAC) is a term that describes the convergence of RF communication and RF sensing, such as radar. The digitizing trend of commercial radar is converging the architecture of its RF frontend (i.e., all the components in the receiver that process the signal at the original incoming radio frequency, before it is converted to a lower intermediate frequency) and its waveforms to be more and more similar to frontend architecture and waveforms for communication. For example, the waveforms used for vehicular radar are evolving from analog-heavy frequency modulated carrier waves (FMCWs) to orthogonal frequency division multiplexed (OFDM) symbols such as are used in telecommunications. In addition, the carrier frequencies that are used for telecommunications are shifting to progressively higher bands (24 GHz, 60 GHz, 77 GHz, and potentially even higher) including frequencies used for radar.

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR.

Figure 5:
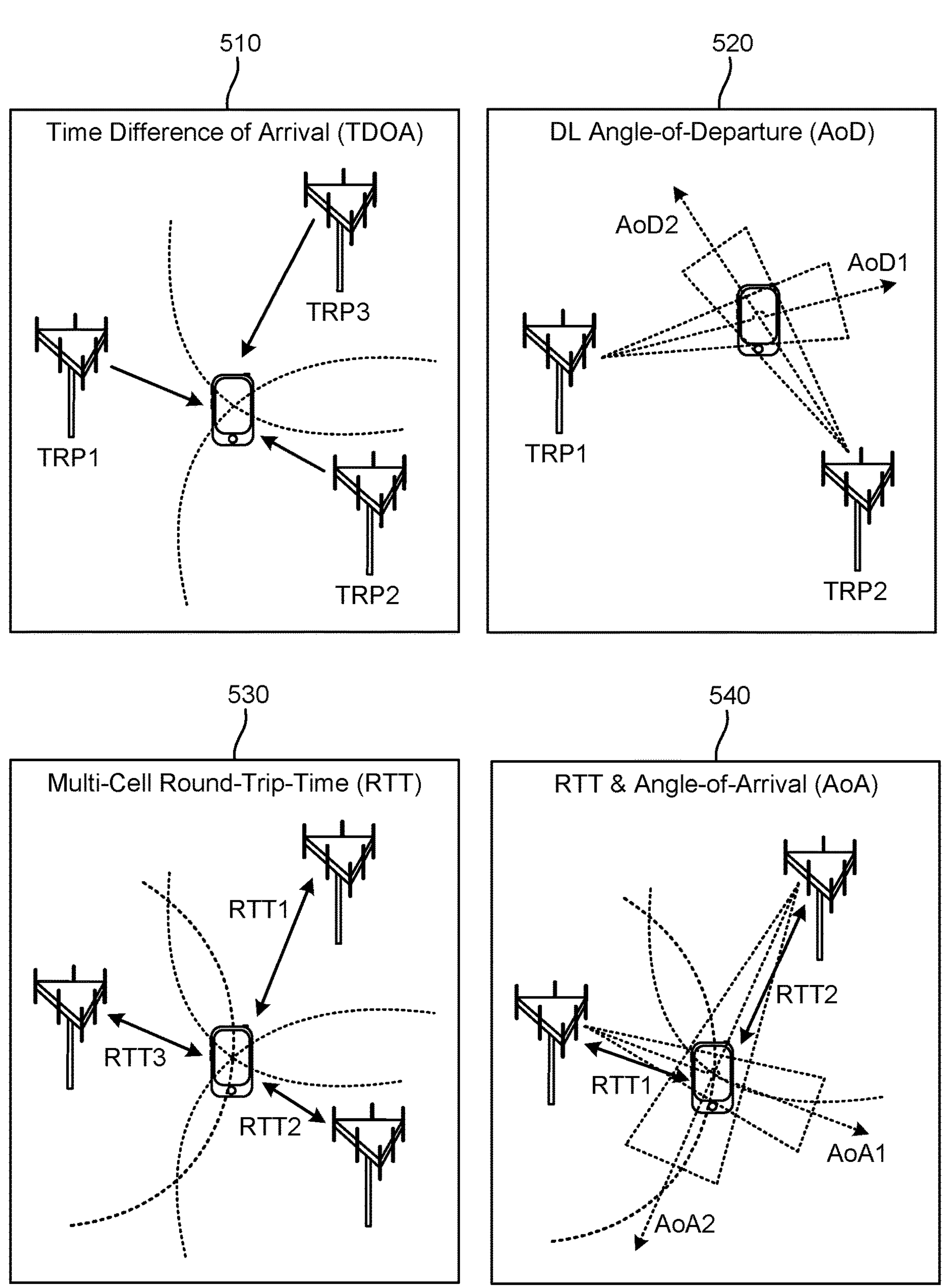
FIG. 5 illustrates examples of various positioning methods supported in New Radio (NR), according to aspects of the disclosure.

FIG. 5 illustrates examples of various positioning methods, according to aspects of the disclosure. In an OTDOA or DL-TDOA positioning procedure, illustrated by scenario 510, a UE measures the differences between the times of arrival (ToAs) of reference signals (e.g., positioning reference signals (PRS)) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity (e.g., the UE for UE-based positioning or a location server for UE-assisted positioning) can estimate the UE's location.

For DL-AoD positioning, illustrated by scenario 520, the positioning entity uses a measurement report from the UE of received signal strength measurements of multiple downlink transmit beams to determine the angle(s) between the UE and the transmitting base station(s). The positioning entity can then estimate the location of the UE based on the determined angle(s) and the known location(s) of the transmitting base station(s).

Uplink-based positioning methods include uplink time difference of arrival (UL-TDOA) and uplink angle-of-arrival (UL-AoA). UL-TDOA is similar to DL-TDOA, but is based on uplink reference signals (e.g., sounding reference signals (SRS)) transmitted by the UE to multiple base stations. Specifically, a UE transmits one or more uplink reference signals that are measured by a reference base station and a plurality of non-reference base stations. Each base station then reports the reception time (referred to as the relative time of arrival (RTOA)) of the reference signal(s) to a positioning entity (e.g., a location server) that knows the locations and relative timing of the involved base stations. Based on the reception-to-reception (Rx-Rx) time difference between the reported RTOA of the reference base station and the reported RTOA of each non-reference base station, the known locations of the base stations, and their known timing offsets, the positioning entity can estimate the location of the UE using TDOA.

For UL-AoA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods include enhanced cell-ID (E-CID) positioning and multi-round-trip-time (RTT) positioning (also referred to as "multi-cell RTT" and "multi-RTT"). In an RTT procedure, a first entity (e.g., a base station or a UE) transmits a first RTT-related signal (e.g., a PRS or SRS) to a second entity (e.g., a UE or base station), which transmits a second RTT-related signal (e.g., an SRS or PRS) back to the first entity. Each entity measures the time difference between the time of arrival (ToA) of the received RTT-related signal and the transmission time of the transmitted RTT-related signal. This time difference is referred to as a reception-to-transmission (Rx-Tx) time difference. The Rx-Tx time difference measurement may be made, or may be adjusted, to include only a time difference between nearest slot boundaries for the received and transmitted signals. Both entities may then send their Rx-Tx time difference measurement to a location server (e.g., an LMF 270), which calculates the round trip propagation time (i.e., RTT) between the two entities from the two Rx-Tx time difference measurements (e.g., as the sum of the two Rx-Tx time difference measurements). Alternatively, one entity may send its Rx-Tx time difference measurement to the other entity, which then calculates the RTT. The distance between the two entities can be determined from the RTT and the known signal speed (e.g., the speed of light). For multi-RTT positioning, illustrated by scenario 530, a first entity (e.g., a UE or base station) performs an RTT positioning procedure with multiple second entities (e.g., multiple base stations or UEs) to enable the location of the first entity to be determined (e.g., using multilateration) based on distances to, and the known locations of, the second entities. RTT and multi-RTT methods can be combined with other positioning techniques, such as UL-AoA and DL-AoD, to improve location accuracy, as illustrated by scenario 540.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base station(s).

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive slots including PRS, periodicity of the consecutive slots including PRS, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (μs). In some cases, when any of the resources used for the positioning measurement are in FR1, the value range for the uncertainty of the expected RSTD may be +/−32 μs. In other cases, when all of the resources used for the positioning measurement(s) are in FR2, the value range for the uncertainty of the expected RSTD may be +/−8 μs.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Frequency difference of arrival (FDOA) uses the frequency Doppler shift of a moving source and/or multiple receivers to calculate the source point. FDOA may also be referred to as differential Doppler (DD). Like TDOA, FDOA is a technique for estimating the location of a radio transmitter based on observations from other points. It can also be used for estimating one's own position based on observations of multiple transmitters. TDOA and FDOA are sometimes used together to improve location accuracy, and the resulting estimates are somewhat independent. By combining TDOA and FDOA measurements, instantaneous geolocation can be performed in two dimensions.

FDOA differs from TDOA in that the FDOA observation points must be in relative motion with respect to each other and the transmitter. This relative motion results in different doppler shift observations of the transmitter at each location in general. The relative motion can be achieved by using observations in an aircraft, automobile, train, boat, or other moving vehicle, for example. The transmitter location can then be estimated with knowledge of the observation points' location and vector velocities and the observed relative doppler shifts between pairs of locations. The accuracy of the location estimate is related to the bandwidth of the transmitted signal, the signal-to-noise ratio at each observation point, and the geometry and vector velocities of the transmitter and the observation points.

RF sensing is the use of radio frequency signals and their reflections to detect the presence of an object in target volume and optionally its relative motion or change of attitude in 3D space. RF positioning, by contrast, is a ranging operation that attempts to determine an exact distance from one or more RF transmitters and/or receivers, and optionally calculate a location of the object in 3D space, via trilateration or other positioning calculation. RF positioning uses RF sensing, but RF sensing does not necessarily provide an exact (or even estimated) location of the object being sensed.

In NR, positioning signals DL-PRS, SL-PRS, and UL-PRS are OFDM signals rather than frequency modulated continuous wave (FMCW) signals. While FMCW signals have been considered for RF sensing, the need for tight synchronization between the transmitter and the receiver has limited their use to monostatic applications, i.e., where the signal is transmitted and its reflection received by the same entity. In bistatic applications, i.e., where the signal is transmitted by one entity and the reflection of the signal is received by another entity, if the transmitter and receiver are not tightly synchronized, the measurement accuracy may be insufficient even for its RF sensing purpose.

A typical FMCW TX signal is a signal that starts at one frequency and changes its frequency (e.g., linearly increasing) over time until it reaches an end frequency, at which time the signal stops. Such as signal is called a "chirp", and can be specified mathematically as:

$$x(t) = e^{-j2\pi\left(f_c + \frac{B}{T}t\right)t}, \text{ during time } 0 \le t \le T \text{ and } x(t) = 0, \text{ during time } T < t \le T + T_g$$

where $f_c$ is the starting frequency, B=signal bandwidth, T=time duration of each chirp transmission, and $T_g$=guard time. For the monostatic scenario, the receiver has access to the time-synchronized TX signal:

$$r(t) = \sum_i h_i \times \left(t - \frac{2R_i}{c}\right) + n(t)$$

Where $h_i$ is the channel gain, $R_i$ is the range to the reflector, c is the speed of light, n(t) is noise. In a monostatic scenario, where there are multiple targets in the vicinity, each target being at a distance $R_i$, the TX signal is transmitted and the RX signal is a linear combination of the reflections from the multiple targets, where $$\frac{2R_i}{c}$$

is the time delay from the transmitter to the target and back.

Match filtering is then performed, where $\phi_i$ is a phase quantity independent of t:

$$r(t)x*(t) = \sum_i h_i e^{-j2\pi\left(f_c + \frac{B}{T}\left(t - \frac{2R_i}{c}\right)\right)\left(t - \frac{2R_i}{c}\right) + j2\pi\left(f_c + \frac{B}{T}t\right)t} = \sum_i h_i e^{j\phi_i} e^{-\frac{j2\pi 2BR_i}{cT}t}.$$

Match filtering can be performed because it can be presumed that there is not time offset between the transmitter and the receiver, e.g., they are using the same clock or a same time reference signal is provided to both of them. Since the RX signal is expressed as a sum of sinusoids, taking the fast Fourier transform (FFT) of the signal and measuring the peaks in frequency gives the scaled range for each reflector. (If there is only one peak, there is only one reflector.) The value of a peak corresponds to the component $$\frac{2BR_i}{c.T}:$$

the values of B, c, and T are known, so the value of the range $R_i$ can be derived.

FMCW has some distinct benefits. For example, mapping FMCW signal to NR signal parameters $f_c$=60 GHz (e.g., in an unlicensed band), B=400 MHz, the maximum range to be sampled $R_{max}$=150 m, and the chirp duration is one symbol duration at a subcarrier spacing of 120 kHz, e.g., T=8.33 s, results in a maximum observed frequency that can be expected to be present in the processed $$RX \text{ signal} = \frac{2.400e^6.150.120e^3}{3e^8} = 48 \text{ MHz}.$$

Thus, the sampling frequency for the 48 MHz FMCW signal can be much smaller than the sampling frequency needed for a 400 MHz OFDM symbol occupying the same duration of time. The chirp can be generated by an analog front-end, and a simpler receiver can process the 48 MHz signal.

Due to the nature of the processing needed for FMCW signals, however, they are not used for bistatic UE positioning. In a bistatic scenario, the RX signal typically consists of a LOS signal from the transmitter, i.e., the transmitted chirp, and zero or more NLOS reflections of the transmitted signal off of objects. The LOS signal will have the lowest frequency, and signals with longer and longer reflection paths will have higher and higher frequencies. FMCW signals have two disadvantages. First, the FMCW signal typically occupies the entire bandwidth during the chirp, which means that it cannot be frequency division multiplexed with other signals during that time. Second, the receiver needs to be tightly synchronized with the transmitter of the TX signal in order to provide an accurate range measurement, and UEs are not tightly enough synchronized to base stations. The match filtering described above presumes that there is no time offset, or that there is a known time offset, between the transmitter and the receiver, but that is not true for the bistatic case. Therefore, there is a need for techniques for using FMCW signals for UE positioning where the transmitter and the receiver are unsynchronized, such as in bistatic mode.

Accordingly, techniques for FMCW signal based position in NR are herein disclosed, both for cases where the network is synchronized (i.e., where TRPs in the network are synchronized with each other but not with the UEs) and for cases where the network is unsynchronized (i.e., where TRPs in the network are not synchronized with each other or with the UEs).

In TDOA based positioning with a FMCW signal, the Tx signal at the TRP, for example, and the Rx waveform at the UE have an unknown time offset. For mmW systems under most operating conditions, it can be assumed that the time offset (Δt) between the Tx and Rx is much smaller than the FMCW signal symbol duration T That is, there is an assumption that Δt<T. Under this assumption, the same processing as in the monostatic case can be applied and the estimated frequency component gives the pseudo-range (instead of the actual range)

$$\tilde{R}_i = R_i + c * \Delta t$$

In synchronized networks, i.e., where TRPs in the network are synchronized with each other, it can also be assumed that the Δt for one TRP is also the same for the other TRPs. Under this assumption, computing the FDOA using the first (lowest) observed frequencies of different TRPs (which are likely to be the LOS signals) can provide an estimate of the range difference of the UE to a pair of TRPs:

$$\tilde{R}_i - \tilde{R}_j = R_i + c*\Delta t - (R_j + c*\Delta t) = R_i - R_j \ \ldots$$

i.e., the c*Δt cancels out, and the UE position can be accurately calculated. This is true for both monostatic and bistatic radar. The same principles apply to unsynchronized networks, except that there may be a residual range error due to the differences in Δt from one TRP to another TRP, which may be treated as an increase in uncertainty of calculation.

According to aspects of the disclosure, to support FMCW based processing, a new positioning method (FDOA) along with a new PHY layer signal, e.g., the chirp, are defined. This allows specifying FDOA (e.g., rather than TDOA) for two TRPs. Signals from those two TRPs can be configured for a reference signal frequency difference (RSFD) measurement (e.g., rather than reference signal timing difference (RSTD) measurement). Thus, in some aspects, two or more TRPs are configured for FDOA-based positioning of UEs using RSFD measurements of FMCW signals, and one or more UEs are configured to measure the FMCW signals. In some aspects, the UE reports the measurements to a location server or other network entity, which uses the measurements to calculate the position of the UE. In some aspects, the UE uses the measurements to determine its own position.

In some aspects, the parameters of the chirp, such as the chirp duration T, are a function of $f_c$, the subcarrier spacing (SCS), etc. In some aspects, other parameters of the chirp, such as the bandwidth B, the guard time $T_g$, etc., are defined by the location server and will be the same for each TRP, e.g., according to a positioning frequency layer (PFL) configuration. In some aspects, a chirp occupies one OFDM symbol in time. In some aspects, the chirp occupies some or all of the bandwidth supported by the UE, e.g., all of the resource blocks that were allocated to the UE. An example frame is shown in FIG. 6.

Figure 6:
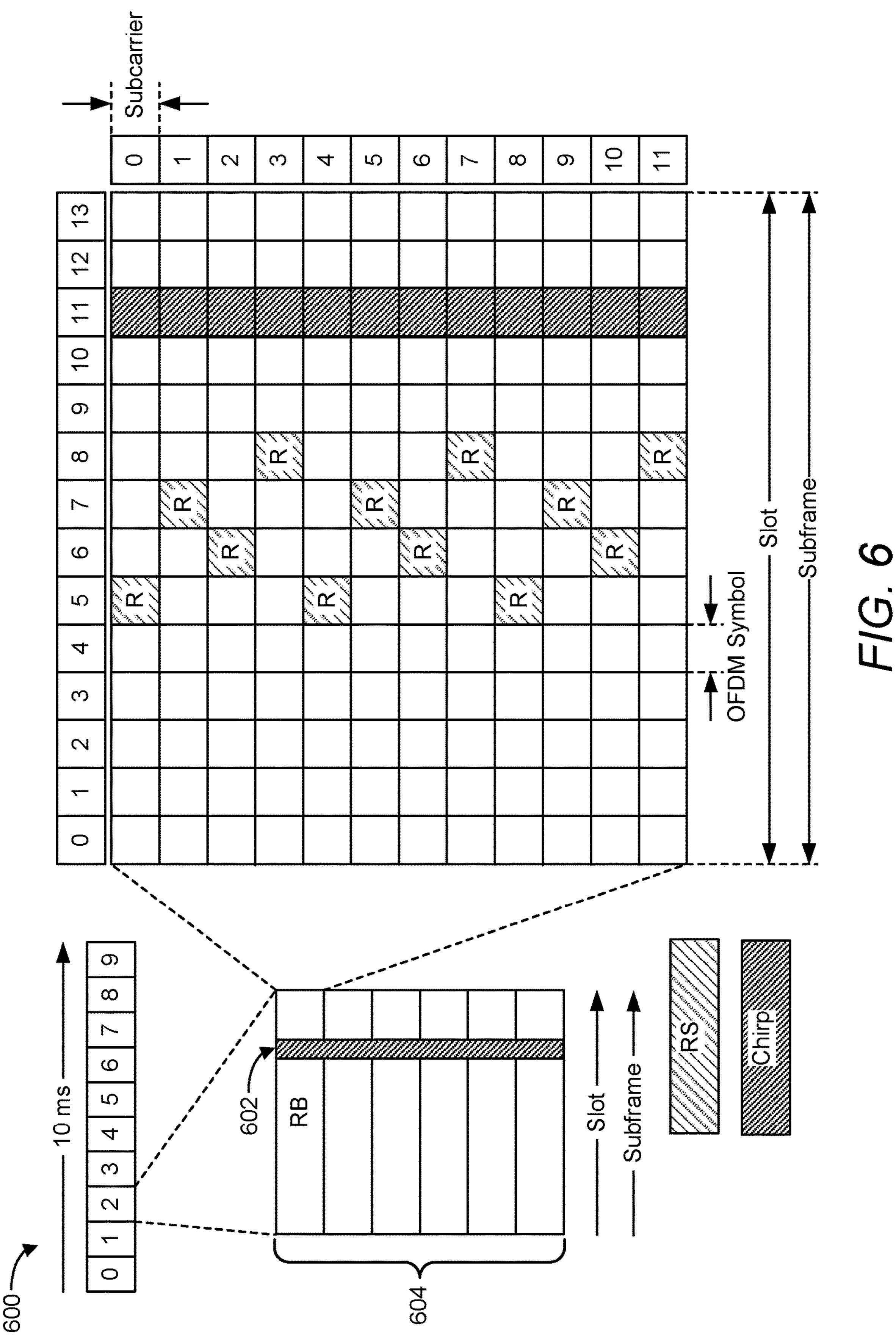
FIG. 6 is a diagram illustrating an example frame structure with a frequency modulated continuous wave (FMCW) chirp, according to aspects of the disclosure.

FIG. 6 is a diagram illustrating an example frame structure 600 with an FMCW chirp 602, according to aspects of the disclosure. The frame structure may be a downlink or uplink frame structure. Other wireless communications technologies may have different frame structures and/or different channels. LTE, and in some cases NR, utilizes orthogonal frequency-division multiplexing (OFDM) on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal fast Fourier transform (FFT) size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies (p), for example, subcarrier spacings of 15 kHz (μ=0), 30 kHz (μ=1), 60 kHz (μ=2), 120 kHz (μ=3), and 240 kHz (μ=4) or greater may be available. In each subcarrier spacing, there are 14 symbols per slot. For 15 kHz SCS (μ=0), there is one slot per subframe, 10 slots per frame, the slot duration is 1 millisecond (ms), the symbol duration is 66.7 microseconds (μs), and the maximum nominal system bandwidth (in MHz) with a 4K FFT size is 50. For 30 kHz SCS (μ=1), there are two slots per subframe, 20 slots per frame, the slot duration is 0.5 ms, the symbol duration is 33.3 μs, and the maximum nominal system bandwidth (in MHz) with a 4K FFT size is 100. For 60 kHz SCS (μ=2), there are four slots per subframe, 40 slots per frame, the slot duration is 0.25 ms, the symbol duration is 16.7 μs, and the maximum nominal system bandwidth (in MHz) with a 4K FFT size is 200. For 120 kHz SCS (μ=3), there are eight slots per subframe, 80 slots per frame, the slot duration is 0.125 ms, the symbol duration is 8.33 μs, and the maximum nominal system bandwidth (in MHz) with a 4K FFT size is 400. For 240 kHz SCS (μ=4), there are 16 slots per subframe, 160 slots per frame, the slot duration is 0.0625 ms, the symbol duration is 4.17 μs, and the maximum nominal system bandwidth (in MHz) with a 4K FFT size is 800.

In the example of FIG. 6, a numerology of 15 kHz is used. Thus, in the time domain, a 10 ms frame is divided into 10 equally sized subframes of 1 ms each, and each subframe includes one time slot. In FIG. 6, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIG. 6, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs may carry reference (pilot) signals (RS). The reference signals may include positioning reference signals (PRS), tracking reference signals (TRS), phase tracking reference signals (PTRS), cell-specific reference signals (CRS), channel state information reference signals (CSI-RS), demodulation reference signals (DMRS), primary synchronization signals (PSS), secondary synchronization signals (SSS), synchronization signal blocks (SSBs), sounding reference signals (SRS), etc., depending on whether the illustrated frame structure is used for uplink or downlink communication. FIG. 6 illustrates example locations of REs carrying a reference signal (labeled "R").

In the example shown in FIG. 6, the frame 600 also includes a chirp 602 in OFDM symbol position 11. As shown in FIG. 6, the chirp 602 occupies the entire bandwidth 604 which has been allocated to the UE, but in other aspects, the chirp 602 may occupy less than the entire bandwidth 604.

Figure 7:
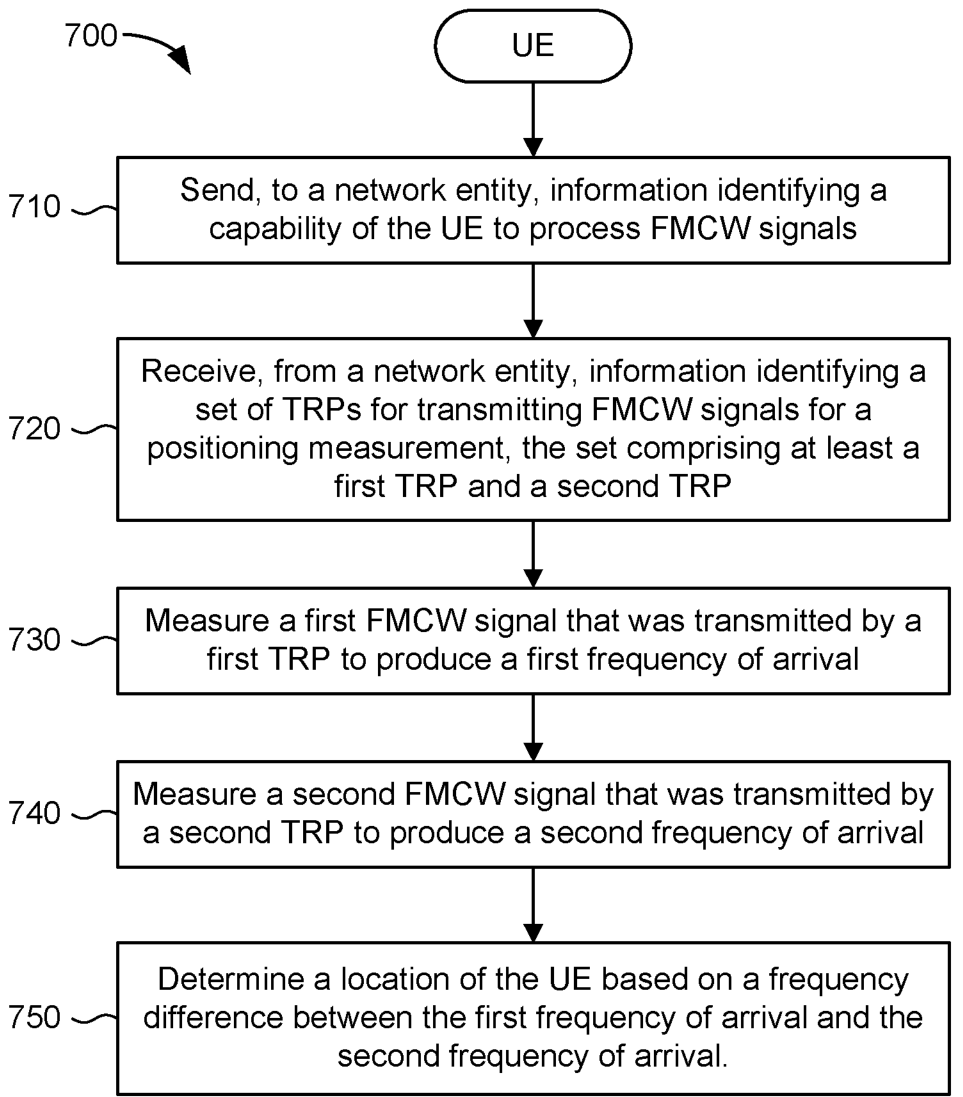
FIG. 7 is a flowchart of an example process, performed by a UE, associated with FMCW signal-based positioning in NR, according to aspects of the disclosure.

FIG. 7 is a flowchart of an example process 700 associated with FMCW signal-based positioning in NR, according to aspects of the disclosure. In some implementations, one or more process blocks of FIG. 7 may be performed by a user equipment (UE) (e.g., UE 104). In some implementations, one or more process blocks of FIG. 7 may be performed by another device or a group of devices separate from or including the UE. Additionally, or alternatively, one or more process blocks of FIG. 7 may be performed by one or more components of UE 302, such as processor(s) 332, memory 340, WWAN transceiver(s) 310, short-range wireless transceiver(s) 320, satellite signal receiver 330, sensor(s) 344, user interface 346, and FMCW positioning(s) 342, any or all of which may be means for performing the operations of process 700.

As shown in FIG. 7, process 700 may include, at block 710, sending, to a network entity, information identifying a capability of the UE to process frequency modulated continuous wave (FMCW) signals. Means for performing the operation of block 710 may include the processor(s) 332, memory 340, or WWAN transceiver(s) 310 of the UE 302. For example, the UE 302 may send the information using the transmitter(s) 314.

As further shown in FIG. 7, process 700 may include, at block 720, receiving, from a network entity, information identifying a set of at least two transmission/reception points (TRPs) for transmitting FMCW signals for a positioning measurement. Means for performing the operation of block 720 may include the processor(s) 332, memory 340, or WWAN transceiver(s) 310 of the UE 302. For example, the UE 302 may receive this information using the receiver(s) 312.

As further shown in FIG. 7, process 700 may include, at block 730, measuring a first FMCW signal that was transmitted by a first TRP from the set of TRPs to produce a first frequency of arrival. Means for performing the operation of block 730 may include the processor(s) 332, memory 340, or WWAN transceiver(s) 310 of the UE 302. For example, the UE 302 may measure the first FMCW signal and produce the first frequency of arrival, using the receiver(s) 312 and the processor(s) 332.

As further shown in FIG. 7, process 700 may include, at block 740, measuring a second FMCW signal that was transmitted by a second TRP from the set of TRPs to produce a second frequency of arrival. Means for performing the operation of block 740 may include the processor(s) 332, memory 340, or WWAN transceiver(s) 310 of the UE 302. For example, the UE 302 may measure the second FMCW signal and produce the second frequency of arrival, using the receiver(s) 312 and the processor(s) 332.

As further shown in FIG. 7, process 700 may include, at block 750, determining a location of the UE based on a frequency difference between the first frequency of arrival and the second frequency of arrival. Means for performing the operation of block 750 may include the processor(s) 332, memory 340, or WWAN transceiver(s) 310 of the UE 302. For example, the UE 302 may determine the location of the UE using the processor(s) 332.

In some aspects, sending the information identifying a capability of the UE to process FMCW signals comprises sending at least one of an indication that the UE can or cannot process FMCW signals, an indication of how many FMCW signals per TRP that the UE can support, an indication of how many FMCW signals per resource set that the UE can support, an indication that the UE can or cannot support both FMCW signals and orthogonal frequency division multiplexing (OFDM) signals in a same resource set, an indication that the UE can or cannot support both FMCW signals and OFDM signals in a positioning reference signal (PRS) processing window, an indication of processing time for FMCW signals, or an indication of processing time for OFDM signals.

In some aspects, process 700 includes measuring the first FMCW signal that was transmitted by the first TRP from the set of TRPs to produce the first frequency of arrival comprises determining frequency components of the first FMCW signal and identifying a lowest frequency component of the first FMCW signal as the first frequency of arrival, and measuring the second FMCW signal that was transmitted by the second TRP from the set of TRPs to produce the second frequency of arrival comprises determining frequency components of the second FMCW signal and identifying a lowest frequency component of the second FMCW signal as the second frequency of arrival.

In some aspects, determining the location of the UE based on the frequency difference between the first frequency of arrival and the second frequency of arrival comprises determining, based on the first frequency of arrival, a first pseudo range comprising a first range to the first TRP and a range error based on a timing error between the UE and the first TRP, determining, based on the second frequency of arrival, a second pseudo range comprising a second range to the second TRP and a range error based on a timing error between the UE and the second TRP, determining the location of the UE based on the first pseudo range and the second pseudo range.

In some aspects, the positioning measurement comprises a frequency difference of arrival (FDOA) measurement and wherein determining the location of the UE based on the first pseudo range and the second pseudo range comprises determining a range difference between the first range to the first TRP and the second range to the second TRP, and determining the location of the UE based on the range difference between the first range to the first TRP and the second range to the second TRP.

In some aspects, determining the range difference between the first range to the first TRP and the second range to the second TRP comprises calculating subtracting the second pseudo range from the first pseudo range, which cancels the range error and produces the range difference between first range to the first TRP and the second range to the second TRP.

In some aspects, the UE knows a location of the first TRP and a location of the second TRP and wherein determining the location of the UE based on the range difference between the first range to the first TRP and the second range to the second TRP comprises calculating the location of the UE using trilateration and the locations of the first TRP and the second TRP.

In some aspects, determining the location of the UE based on the range difference between the first range to the first TRP and the second range to the second TRP comprises providing the range difference between the first range to the first TRP and the second range to the second TRP to a network entity, and receiving, from the network entity, the location of the UE.

In some aspects, the network entity comprises a location server.

In some aspects, the positioning measurement comprises a round trip time (RTT) measurement and wherein determining the location of the UE based on the first pseudo range and the second pseudo range comprises determining a range to the first TRP using a RTT calculation using the first pseudo range, determining a range to the second TRP using a second RTT calculation using the second pseudo range, and determining the location of the UE based on the range to the first TRP and the range to the second TRP.

In some aspects, determining the location of the UE based on the range to the first TRP and the range to the second TRP comprises providing, to a network entity, the range to the first TRP and the range to the second TRP, and receiving, from the network entity, the location of the UE.

In some aspects, process 700 includes reporting, to the network entity, at least one of information identifying a resource or resource set, information identifying a set of one or more preferred TRPs, a list of all of the frequency components of at least one of the first FMCW signal or the second FMCW signal, line-of-sight (LOS) or non-line-of-sight (NLOS) reporting, reference signal received power (RSRP) of at least one of the first FMCW signal or the second FMCW signal, a time stamp of at least one of the first FMCW signal or the second FMCW signal, or a measurement quality of at least one of the first FMCW signal or the second FMCW signal.

In some aspects, the positioning measurement comprises a frequency difference of arrival (FDOA) measurement, an angle of departure (AOD) measurement, an angle of arrival (AOA) measurement, a double-differential time difference of arrival (TDOA) measurement, a differential round-trip time (RTT) measurement, a double differential RTT measurement, or a combination thereof.

In some aspects, the positioning measurement comprises a positioning measurement based on measurement of a FMCW signal and a measurement of an orthogonal frequency division multiplexing (OFDM) signal.

In some aspects, the FMCW signal is transmitted by a first TRP and the OFDM signal is transmitted by a second TRP, the FMCW signal is transmitted on a first subset of positioning reference signal (PRS) resources and the OFDM signal is transmitted on a second subset of the PRS resources, the FMCW signal and the OFDM signal are time division multiplexed, space division multiplexed, or frequency division multiplexed with each other, or a combination thereof.

In some aspects, the network entity comprises a location server.

Process 700 may include additional implementations, such as any single implementation or any combination of implementations described below and/or in connection with one or more other processes described elsewhere herein. Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8A:
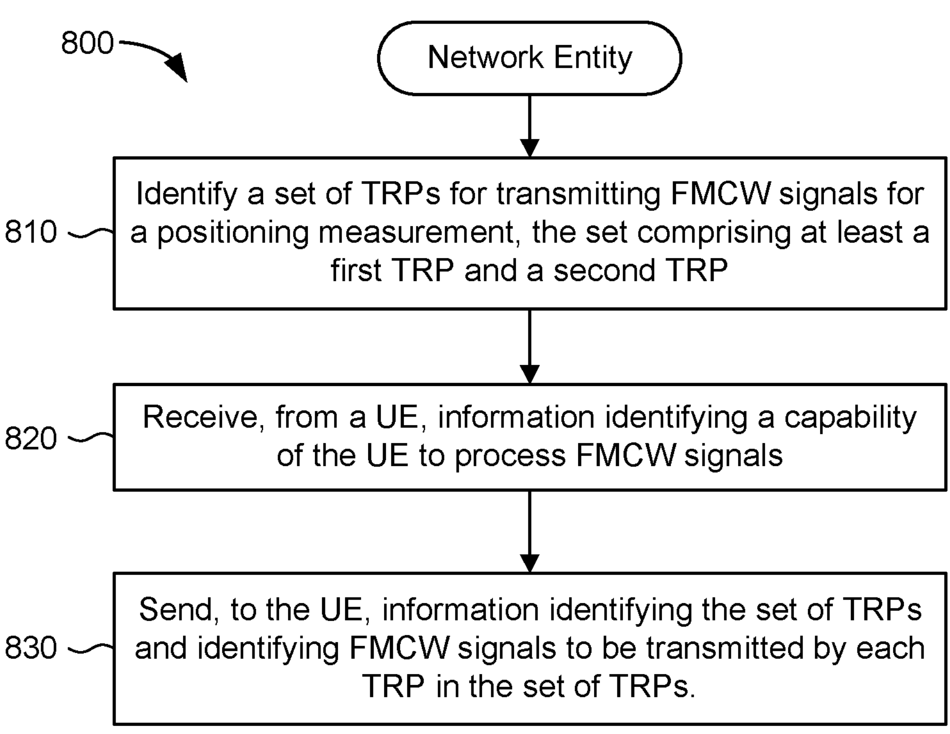
FIGS. 8A and 8B are flowcharts showing portions of an example process, performed by a network entity, associated with FMCW signal-based positioning in NR, according to aspects of the disclosure.
Figure 8B:
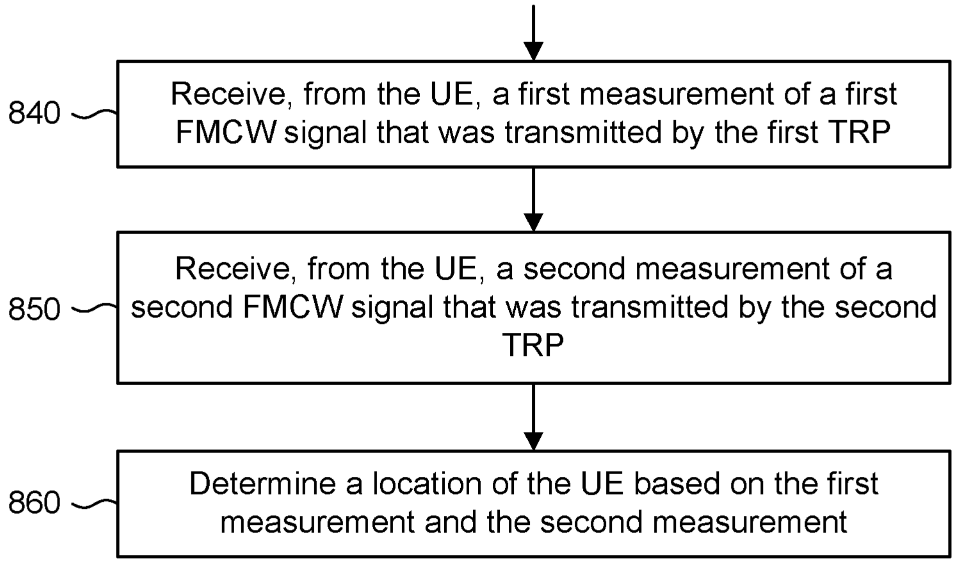

FIG. 8A and FIG. 8B are flowcharts showing portions of an example process 800 associated with FMCW signal-based positioning in NR, according to aspects of the disclosure. In some implementations, one or more process blocks of FIG. 8A and FIG. 8B may be performed by a network entity (e.g., a location server 172, which may or may not be combined with a BS 102). In some implementations, one or more process blocks of FIG. 8A and FIG. 8B may be performed by another device or a group of devices separate from or including the network entity. Additionally, or alternatively, one or more process blocks of FIG. 8A and FIG. 8B may be performed by one or more components of network entity 306, such as processor(s) 394, memory 396, network transceiver(s) 390, and FMCW positioning component(s) 398, any or all of which may be means for performing the operations of process 800.

As shown in FIG. 8A, process 800 may include, at block 810, identifying a set of transmission/reception points (TRPs) for transmitting frequency modulated continuous wave (FMCW) signals for a positioning measurement, the set comprising at least a first TRP and a second TRP. Means for performing the operation of block 810 may include the processor(s) 394, memory 396, or network transceiver(s) 390 of the network entity 306. For example, the network entity 306 may identify the set of TRPs using the processor(s) 394 and the memory 396.

As further shown in FIG. 8A, process 800 may include, at block 820, receiving, from a user equipment (UE), information identifying a capability of the UE to process FMCW signals. Means for performing the operation of block 820 may include the processor(s) 394, memory 396, or network transceiver(s) 390 of the network entity 306. For example, the network entity 306 may receive the information identifying a capability of the UE to process FMCW signals, using the network transceiver(s) 390.

As further shown in FIG. 8A, process 800 may include, at block 830, sending, to the UE, information identifying the set of TRPs and identifying FMCW signals to be transmitted by each TRP in the set of TRPs. Means for performing the operation of block 830 may include the processor(s) 394, memory 396, or network transceiver(s) 390 of the network entity 306. For example, the network entity 306 may send this information to the UE, using the network transceiver(s) 390.

In some aspects, receiving the information identifying a capability of the UE to process FMCW signals comprises receiving at least one of an indication that the UE can or cannot process FMCW signals, an indication of how many FMCW signals per TRP that the UE can support, an indication of how many FMCW signals per resource set that the UE can support, an indication that the UE can or cannot support both FMCW signals and orthogonal frequency division multiplexing (OFDM) signals in a same resource set, an indication that the UE can or cannot support both FMCW signals and OFDM signals in a positioning reference signal (PRS) processing window, an indication of processing time for FMCW signals, or an indication of processing time for OFDM signals.

As shown in FIG. 8B, process 800 may further include, at block 840, receiving, from the UE, a first measurement of a first FMCW signal that was transmitted by the first TRP. Means for performing the operation of block 840 may include the processor(s) 394, memory 396, or network transceiver(s) 390 of the network entity 306. For example, the network entity 306 may receive the first measurement using the network transceiver(s) 390.

As shown in FIG. 8B, process 800 may further include, at block 850, receiving, from the UE, a second measurement of a second FMCW signal that was transmitted by the second TRP. Means for performing the operation of block 850 may include the processor(s) 394, memory 396, or network transceiver(s) 390 of the network entity 306. For example, the network entity 306 may receive the second measurement using the network transceiver(s) 390.

As shown in FIG. 8B, process 800 may further include, at block 860, determining a location of the UE based on the first measurement and the second measurement. Means for performing the operation of block 860 may include the processor(s) 394, memory 396, or network transceiver(s) 390 of the network entity 306. For example, the network entity 306 may determine the location of the UE using the processor(s) 394 and memory 396.

In some aspects, the first measurement of the first FMCW signal comprises a first frequency of arrival, wherein the second measurement of the second FMCW comprises a second frequency of arrival, and wherein determining the location of the UE based on the first measurement and the second measurement comprises determining the location of the UE based on a frequency difference between the first frequency of arrival and the second frequency of arrival.

In some aspects, determining the location of the UE based on the frequency difference between the first frequency of arrival and the second frequency of arrival comprises determining, based on the first frequency of arrival, a first pseudo range comprising a first range from the UE to the first TRP and a range error based on a timing error between the UE and the first TRP, determining, based on the second frequency of arrival, a second pseudo range comprising a second range from the UE to the second TRP and a range error based on a timing error between the UE and the second TRP, determining the location of the UE based on the first pseudo range and the second pseudo range.

In some aspects, the positioning measurement comprises a frequency difference of arrival (FDOA) measurement and wherein determining the location of the UE based on the first pseudo range and the second pseudo range comprises determining a range difference between the first range from the UE to the first TRP and the second range from the UE to the second TRP, and determining the location of the UE based on the range difference between the first range from the UE to the first TRP and the second range from the UE to the second TRP.

In some aspects, determining the range difference between the first range from the UE to the first TRP and the second range from the UE to the second TRP comprises calculating subtracting the second pseudo range from the first pseudo range, which cancels the range error and produces the range difference between first range from the UE to the first TRP and the second range from the UE to the second TRP.

In some aspects, the positioning measurement comprises a round trip time (RTT) measurement and wherein determining the location of the UE based on the first pseudo range and the second pseudo range comprises determining a range from the UE to the first TRP using a RTT calculation using the first pseudo range, determining a range from the UE to the second TRP using a second RTT calculation using the second pseudo range, and determining the location of the UE based on the range from the UE to the first TRP and the range from the UE to the second TRP.

In some aspects, process 800 includes receiving, from the UE, at least one of information identifying a resource or resource set, information identifying a set of one or more preferred TRPs, a list of all of the frequency components of at least one of the first FMCW signal or the second FMCW signal, line-of-sight (LOS) or non-line-of-sight (NLOS) reporting, reference signal received power (RSRP) of at least one of the first FMCW signal or the second FMCW signal, a time stamp of at least one of the first FMCW signal or the second FMCW signal, or a measurement quality of at least one of the first FMCW signal or the second FMCW signal.

In some aspects, the positioning measurement comprises a frequency difference of arrival (FDOA) measurement, an angle of departure (AOD) measurement, an angle of arrival (AOA) measurement, a double-differential time difference of arrival (TDOA) measurement, a differential round-trip time (RTT) measurement, a double differential RTT measurement, or a combination thereof.

In some aspects, the positioning measurement comprises a positioning measurement based on measurement of a FMCW signal and a measurement of an orthogonal frequency division multiplexing (OFDM) signal.

In some aspects, process 800 includes the FMCW signal is transmitted by a first TRP and the OFDM signal is transmitted by a second TRP, the FMCW signal is transmitted on a first subset of positioning reference signal (PRS) resources and the OFDM signal is transmitted on a second subset of the PRS resources, the FMCW signal and the OFDM signal are time division multiplexed, space division multiplexed, or frequency division multiplexed with each other, or a combination thereof.

In some aspects, the network entity comprises a location server.

Process 800 may include additional implementations, such as any single implementation or any combination of implementations described below and/or in connection with one or more other processes described elsewhere herein. Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

In some aspects, the same process described above for two TRPs can be extended, e.g., to use one TRP as the reference and keep taking differences of frequencies (range) to other TRPs.

In some aspects, additional reporting will be supported, including, but not limited to, reporting of any one or more of the following: resource and resource set ID; choice of reference TRP for reporting differences; all of the frequency components (equivalent to multipath reporting); line-of-sight (LOS) and non-line-of-sight (NLOS) reporting based on the FFT output shape (equivalent to channel impulse response (CIR)-based LOS/NLOS); frequency reference signal received power (RSRP) (equivalent to PRS-RSRP in the time domain) and per-path frequency RSRP); time stamps; or measurement quality.

In some aspects, FMCW signals are used for Multi-RTT positioning. For example, in an RTT measurement between a UE and a BS, the downlink range can be estimated as $R_i+c*\Delta t$ and the uplink range can be estimated as $R_i-c*\Delta t$, such that the round trip time is calculated as $R_i+c*\Delta t+(R_i-c*\Delta t)=2R_i$, i.e., the $c*\Delta t$ cancels out. Likewise, in some aspects, FMCW signals are used for DL-AoD and UL-AoA based positioning, etc., in the same manner as OFDM signals are used for those purposes. For example, double differential TDOA, differential and double differential RTT, and joint delay plus angle methods are all feasible using FMCW signals.

In some aspects, FMCW signals and NR-OFDM/SC-FDM signals can be used jointly. In some aspects, a subset $S_1$ of TRPs transmits OFDM signals while subset $S_2$ of TRPs can transmit FMCW signals. In some aspects, a subset of PRS resources in each PRS resource set, e.g., from one TRP, can be OFDM while other PRS resources in the same set can be FMCW signals. In some aspects, FMCW and OFDM signals can be time division multiplexed (TDM), space division multiplexed (SDM) on separate beams, or frequency division multiplexed (FDM) in separate frequency chunks (in typical architectures, FMCW signals and OFDM signals cannot be comb multiplexed or code multiplexed because they share an RF transmission chain, but this limitation may be overcome with more expensive architectures, e.g., with duplicate RF transmission chains).

In some aspects, a UE may report a measurement which uses a combination of OFDM & FMCW signals. For example, in some aspects, a UE reports a time difference between time $t_1$ and time $t_2$, where $t_1$ is obtained by measuring an FMCW signal, performing FFT on the signal to identify frequency peaks that correspond to different ranges, and translating the first observed peak to a delay, and $t_2$ is measured directly from the receive time of an OFDM signal. Similarly, for RTT, in some aspects, a UE may measure FMCW in DL and transmit OFDM based UL-SRS in the UL. These examples are illustrative and not limiting.

In some aspects, a UE may indicate capability for processing FMCW signals for positioning. In some aspects, the UE may indicate that it can or cannot process FMCW signals and/or that it can or cannot perform an FDOA calculation. In some aspects, the UE may indicate the number of FMCW signals per TRP that the UE can support. In some aspects, the UE may indicate the number of FMCW signals per resource set that the UE can support. In some aspects, the UE may indicate whether or not the UE can support a mix of FMCW and OFDM signals in each resource set. In some aspects, the UE may indicate whether or not the UE can process both FMCW and OFDM signals in the same measurement gap or PRS processing window, or indicate that the UE can only process one or other of the two types of signals. In some aspects, different processing times may be designated for FMCW signals versus OFDM signals, since they operate at different sampling rates.

As will be appreciated, a technical advantage of the techniques described herein include, but are not limited to, the following. A positioning-only UE can be made cheaply, e.g., if it only measures the chirp and calculates its own position.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method of wireless positioning performed by a user equipment (UE), the method comprising: sending, to a network entity, information identifying a capability of the UE to process frequency modulated continuous wave (FMCW) signals; receiving, from a network entity, information identifying a set of transmission/reception points (TRPs) for transmitting FMCW signals for a positioning measurement, the set comprising at least a first TRP and a second TRP; measuring a first FMCW signal that was transmitted by the first TRP to produce a first frequency of arrival; measuring a second FMCW signal that was transmitted by the second TRP to produce a second frequency of arrival; and determining a location of the UE based on a frequency difference between the first frequency of arrival and the second frequency of arrival.

Clause 2. The method of clause 1, wherein sending the information identifying a capability of the UE to process FMCW signals comprises sending at least one of: an indication that the UE can or cannot process FMCW signals; an indication of how many FMCW signals per TRP that the UE can support; an indication of how many FMCW signals per resource set that the UE can support; an indication that the UE can or cannot support both FMCW signals and orthogonal frequency division multiplexing (OFDM) signals in a same resource set; an indication that the UE can or cannot support both FMCW signals and OFDM signals in a positioning reference signal (PRS) processing window; an indication of processing time for FMCW signals; or an indication of processing time for OFDM signals.

Clause 3. The method of any of clauses 1 to 2, wherein: measuring the first FMCW signal that was transmitted by the first TRP to produce the first frequency of arrival comprises determining frequency components of the first FMCW signal and identifying a lowest frequency component of the first FMCW signal as the first frequency of arrival; and measuring the second FMCW signal that was transmitted by the second TRP to produce the second frequency of arrival comprises determining frequency components of the second FMCW signal and identifying a lowest frequency component of the second FMCW signal as the second frequency of arrival.

Clause 4. The method of any of clauses 1 to 3, wherein determining the location of the UE based on the frequency difference between the first frequency of arrival and the second frequency of arrival comprises: determining, based on the first frequency of arrival, a first pseudo range comprising a first range to the first TRP and a range error based on a timing error between the UE and the first TRP; determining, based on the second frequency of arrival, a second pseudo range comprising a second range to the second TRP and a range error based on a timing error between the UE and the second TRP; determining the location of the UE based on the first pseudo range and the second pseudo range.

Clause 5. The method of clause 4, wherein the positioning measurement comprises a frequency difference of arrival (FDOA) measurement and wherein determining the location of the UE based on the first pseudo range and the second pseudo range comprises: determining a range difference between the first range to the first TRP and the second range to the second TRP; and determining the location of the UE based on the range difference between the first range to the first TRP and the second range to the second TRP.

Clause 6. The method of clause 5, wherein determining the range difference between the first range to the first TRP and the second range to the second TRP comprises calculating subtracting the second pseudo range from the first pseudo range, which cancels the range error and produces the range difference between first range to the first TRP and the second range to the second TRP.

Clause 7. The method of any of clauses 5 to 6, wherein the UE knows a location of the first TRP and a location of the second TRP and wherein determining the location of the UE based on the range difference between the first range to the first TRP and the second range to the second TRP comprises calculating the location of the UE using trilateration and the locations of the first TRP and the second TRP.

Clause 8. The method of any of clauses 5 to 7, wherein determining the location of the UE based on the range difference between the first range to the first TRP and the second range to the second TRP comprises: providing the range difference between the first range to the first TRP and the second range to the second TRP to a network entity; and receiving, from the network entity, the location of the UE.

Clause 9. The method of clause 8, wherein the network entity comprises a location server.

Clause 10. The method of any of clauses 4 to 9, wherein the positioning measurement comprises a round trip time (RTT) measurement and wherein determining the location of the UE based on the first pseudo range and the second pseudo range comprises: determining a range to the first TRP using a RTT calculation using the first pseudo range; determining a range to the second TRP using a second RTT calculation using the second pseudo range; and determining the location of the UE based on the range to the first TRP and the range to the second TRP.

Clause 11. The method of clause 10, wherein determining the location of the UE based on the range to the first TRP and the range to the second TRP comprises: providing, to a network entity, the range to the first TRP and the range to the second TRP; and receiving, from the network entity, the location of the UE.

Clause 12. The method of any of clauses 1 to 11, further comprising reporting, to the network entity, at least one of: information identifying a resource or resource set; information identifying a set of one or more preferred TRPs; a list of all of the frequency components of at least one of the first FMCW signal or the second FMCW signal; line-of-sight (LOS) or non-line-of-sight (NLOS) reporting; frequency reference signal received power (RSRP) of at least one of the first FMCW signal or the second FMCW signal; a time stamp of at least one of the first FMCW signal or the second FMCW signal; or a measurement quality of at least one of the first FMCW signal or the second FMCW signal.

Clause 13. The method of any of clauses 1 to 12, wherein the positioning measurement comprises a frequency difference of arrival (FDOA) measurement, an angle of departure (AOD) measurement, an angle of arrival (AOA) measurement, a double-differential time difference of arrival (TDOA) measurement, a differential round-trip time (RTT) measurement, a double differential RTT measurement, or a combination thereof.

Clause 14. The method of any of clauses 1 to 13, wherein the positioning measurement comprises a positioning measurement based on measurement of a FMCW signal and a measurement of an orthogonal frequency division multiplexing (OFDM) signal.

Clause 15. The method of clause 14, wherein: the FMCW signal is transmitted by a first TRP and the OFDM signal is transmitted by a second TRP; the FMCW signal is transmitted on a first subset of positioning reference signal (PRS) resources and the OFDM signal is transmitted on a second subset of the PRS resources; the FMCW signal and the OFDM signal are time division multiplexed, space division multiplexed, or frequency division multiplexed with each other; or a combination thereof.

Clause 16. The method of any of clauses 11 to 15, wherein the network entity comprises a location server.

Clause 17. A method of wireless positioning performed by a network entity, the method comprising: identifying a set of transmission/reception points (TRPs) for transmitting frequency modulated continuous wave (FMCW) signals for a positioning measurement, the set comprising at least a first TRP and a second TRP; receiving, from a user equipment (UE), information identifying a capability of the UE to process FMCW signals; and sending, to the UE, information identifying the set of TRPs and identifying FMCW signals to be transmitted by each TRP in the set of TRPs.

Clause 18. The method of clause 17, wherein receiving the information identifying a capability of the UE to process FMCW signals comprises receiving at least one of: an indication that the UE can or cannot process FMCW signals; an indication of how many FMCW signals per TRP that the UE can support; an indication of how many FMCW signals per resource set that the UE can support; an indication that the UE can or cannot support both FMCW signals and orthogonal frequency division multiplexing (OFDM) signals in a same resource set; an indication that the UE can or cannot support both FMCW signals and OFDM signals in a positioning reference signal (PRS) processing window; an indication of processing time for FMCW signals; or an indication of processing time for OFDM signals.

Clause 19. The method of any of clauses 17 to 18, further comprising: receiving, from the UE, a first measurement of a first FMCW signal that was transmitted by the first TRP; receiving, from the UE, a second measurement of a second FMCW signal that was transmitted by the second TRP; and determining a location of the UE based on the first measurement and the second measurement.

Clause 20. The method of clause 19, wherein the first measurement of the first FMCW signal comprises a first frequency of arrival, wherein the second measurement of the second FMCW comprises a second frequency of arrival, and wherein determining the location of the UE based on the first measurement and the second measurement comprises determining the location of the UE based on a frequency difference between the first frequency of arrival and the second frequency of arrival.

Clause 21. The method of clause 20, wherein determining the location of the UE based on the frequency difference between the first frequency of arrival and the second frequency of arrival comprises: determining, based on the first frequency of arrival, a first pseudo range comprising a first range from the UE to the first TRP and a range error based on a timing error between the UE and the first TRP; determining, based on the second frequency of arrival, a second pseudo range comprising a second range from the UE to the second TRP and a range error based on a timing error between the UE and the second TRP; determining the location of the UE based on the first pseudo range and the second pseudo range.

Clause 22. The method of clause 21, wherein the positioning measurement comprises a frequency difference of arrival (FDOA) measurement and wherein determining the location of the UE based on the first pseudo range and the second pseudo range comprises: determining a range difference between the first range from the UE to the first TRP and the second range from the UE to the second TRP; and determining the location of the UE based on the range difference between the first range from the UE to the first TRP and the second range from the UE to the second TRP.

Clause 23. The method of clause 22, wherein determining the range difference between the first range from the UE to the first TRP and the second range from the UE to the second TRP comprises calculating subtracting the second pseudo range from the first pseudo range, which cancels the range error and produces the range difference between first range from the UE to the first TRP and the second range from the UE to the second TRP.

Clause 24. The method of any of clauses 21 to 23, wherein the positioning measurement comprises a round trip time (RTT) measurement and wherein determining the location of the UE based on the first pseudo range and the second pseudo range comprises: determining a range from the UE to the first TRP using a RTT calculation using the first pseudo range; determining a range from the UE to the second TRP using a second RTT calculation using the second pseudo range; and determining the location of the UE based on the range from the UE to the first TRP and the range from the UE to the second TRP.

Clause 25. The method of any of clauses 17 to 24, further comprising receiving, from the UE, at least one of: information identifying a resource or resource set; information identifying a set of one or more preferred TRPs; a list of all of the frequency components of at least one of the first FMCW signal or the second FMCW signal; line-of-sight (LOS) or non-line-of-sight (NLOS) reporting; frequency reference signal received power (RSRP) of at least one of the first FMCW signal or the second FMCW signal; a time stamp of at least one of the first FMCW signal or the second FMCW signal; or a measurement quality of at least one of the first FMCW signal or the second FMCW signal.

Clause 26. The method of any of clauses 17 to 25, wherein the positioning measurement comprises a frequency difference of arrival (FDOA) measurement, an angle of departure (AOD) measurement, an angle of arrival (AOA) measurement, a double-differential time difference of arrival (TDOA) measurement, a differential round-trip time (RTT) measurement, a double differential RTT measurement, or a combination thereof.

Clause 27. The method of any of clauses 17 to 26, wherein the positioning measurement comprises a positioning measurement based on measurement of a FMCW signal and a measurement of an orthogonal frequency division multiplexing (OFDM) signal.

Clause 28. The method of clause 27, wherein: the FMCW signal is transmitted by a first TRP and the OFDM signal is transmitted by a second TRP; the FMCW signal is transmitted on a first subset of positioning reference signal (PRS) resources and the OFDM signal is transmitted on a second subset of the PRS resources; the FMCW signal and the OFDM signal are time division multiplexed, space division multiplexed, or frequency division multiplexed with each other; or a combination thereof.

Clause 29. The method of any of clauses 17 to 28, wherein the network entity comprises a location server.

Clause 30. A user equipment (UE), comprising: a memory; at least one transceiver; and at least one processor communicatively coupled to the memory and the at least one transceiver, the at least one processor configured to: send, via the at least one transceiver, to a network entity, information identifying a capability of the UE to process frequency modulated continuous wave (FMCW) signals; receive, via the at least one transceiver, from a network entity, information identifying a set of transmission/reception points (TRPs) for transmitting FMCW signals for a positioning measurement, the set comprising at least a first TRP and a second TRP; measure a first FMCW signal that was transmitted by the first TRP to produce a first frequency of arrival; measure a second FMCW signal that was transmitted by the second TRP to produce a second frequency of arrival; and determine a location of the UE based on a frequency difference between the first frequency of arrival and the second frequency of arrival.

Clause 31. A network entity, comprising: a memory; at least one transceiver; and at least one processor communicatively coupled to the memory and the at least one transceiver, the at least one processor configured to: identify a set of transmission/reception points (TRPs) for transmitting frequency modulated continuous wave (FMCW) signals for a positioning measurement, the set comprising at least a first TRP and a second TRP; receive, via the at least one transceiver, from a user equipment (UE), information identifying a capability of the UE to process FMCW signals; and send, via the at least one transceiver, to the UE, information identifying the set of TRPs and identifying FMCW signals to be transmitted by each TRP in the set of TRPs.

Clause 30. An apparatus comprising a memory, a transceiver, and a processor communicatively coupled to the memory and the transceiver, the memory, the transceiver, and the processor configured to perform a method according to any of clauses 1 to 29.

Clause 31. An apparatus comprising means for performing a method according to any of clauses 1 to 29.

Clause 32. A non-transitory computer-readable medium storing computer-executable instructions, the computer-executable comprising at least one instruction for causing a computer or processor to perform a method according to any of clauses 1 to 29.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless positioning performed by a user equipment (UE) that sends and receives orthogonal frequency division multiplexing (OFDM) signals, the method comprising:

sending, to a network entity, information identifying a capability of the UE to process frequency modulated continuous wave (FMCW) signals, wherein a FMCW signal comprises a signal that starts at a start frequency and changes its frequency over time until it reaches an end frequency, at which time the signal stops;

receiving, from a network entity, information identifying a set of transmission/reception points (TRPs) for transmitting FMCW signals for a positioning measurement and identifying FMCW signals to be transmitted by each TRP in the set of TRPs, the set comprising at least a first TRP and a second TRP;

measuring a first FMCW signal that was transmitted by the first TRP to determine a first frequency of arrival;

measuring a second FMCW signal that was transmitted by the second TRP to determine a second frequency of arrival; and determining a location of the UE based on a frequency difference between the first frequency of arrival and the second frequency of arrival.

2. The method of claim 1, wherein sending the information identifying a capability of the UE to process FMCW signals comprises sending at least one of:

an indication that the UE can or cannot process FMCW signals;

an indication of how many FMCW signals per TRP that the UE can support;

an indication of how many FMCW signals per resource set that the UE can support;

an indication that the UE can or cannot support both FMCW signals and OFDM signals in a same resource set;

an indication that the UE can or cannot support both FMCW signals and OFDM signals in a positioning reference signal (PRS) processing window;

an indication of processing time for FMCW signals; or an indication of processing time for OFDM signals.

3. The method of claim 1, wherein:

measuring the first FMCW signal that was transmitted by the first TRP to determine the first frequency of arrival comprises determining frequency components of the first FMCW signal and identifying a lowest frequency component of the first FMCW signal as the first frequency of arrival; and measuring the second FMCW signal that was transmitted by the second TRP to determine the second frequency of arrival comprises determining frequency components of the second FMCW signal and identifying a lowest frequency component of the second FMCW signal as the second frequency of arrival.

4. The method of claim 1, wherein determining the location of the UE based on the frequency difference between the first frequency of arrival and the second frequency of arrival comprises:

determining, based on the first frequency of arrival, a first range to the first TRP having a first range error based on a timing error between the UE and the first TRP;

determining, based on the second frequency of arrival, a second range to the second TRP having a second range error based on a timing error between the UE and the second TRP; and determining the location of the UE based on the first range and the second range.

5. The method of claim 4, wherein the positioning measurement comprises a frequency difference of arrival (FDOA) measurement and wherein determining the location of the UE based on the first range and the second range comprises:

determining a range difference between the first range to the first TRP and the second range to the second TRP; and determining the location of the UE based on the range difference between the first range to the first TRP and the second range to the second TRP.

6. The method of claim 5, wherein determining the range difference between the first range to the first TRP and the second range to the second TRP comprises subtracting the second range from the first range, which cancels the first range error and the second range error and which produces the range difference between first range to the first TRP and the second range to the second TRP.

7. The method of claim 5, wherein the UE knows a location of the first TRP and a location of the second TRP and wherein determining the location of the UE based on the range difference between the first range to the first TRP and the second range to the second TRP comprises calculating the location of the UE using trilateration and the locations of the first TRP and the second TRP.

8. The method of claim 5, wherein determining the location of the UE based on the range difference between the first range to the first TRP and the second range to the second TRP comprises:

providing the range difference between the first range to the first TRP and the second range to the second TRP to a network entity; and receiving, from the network entity, the location of the UE.

9. The method of claim 8, wherein the network entity comprises a location server.

10. The method of claim 4, wherein the positioning measurement comprises a round trip time (RTT) measurement and wherein determining the location of the UE based on the first range and the second range comprises:

determining a range to the first TRP using a RTT calculation using the first range;

determining a range to the second TRP using a second RTT calculation using the second range; and determining the location of the UE based on the range to the first TRP and the range to the second TRP.

11. The method of claim 10, wherein determining the location of the UE based on the range to the first TRP and the range to the second TRP comprises:

providing, to a network entity, the range to the first TRP and the range to the second TRP; and receiving, from the network entity, the location of the UE.

12. The method of claim 1, further comprising reporting, to the network entity, at least one of:

information identifying a resource or resource set;

information identifying a set of one or more preferred TRPs;

a list of all of frequency components of at least one of the first FMCW signal or the second FMCW signal;

line-of-sight (LOS) or non-line-of-sight (NLOS) reporting;

frequency reference signal received power (RSRP) of at least one of the first FMCW signal or the second FMCW signal;

a time stamp of at least one of the first FMCW signal or the second FMCW signal; or a measurement quality of at least one of the first FMCW signal or the second FMCW signal.

13. The method of claim 1, wherein the positioning measurement comprises a frequency difference of arrival (FDOA) measurement, an angle of departure (AOD) measurement, an angle of arrival (AOA) measurement, a double-differential time difference of arrival (TDOA) measurement, a differential round-trip time (RTT) measurement, a double differential RTT measurement, or a combination thereof.

14. The method of claim 1, wherein the positioning measurement comprises a positioning measurement based on measurement of an FMCW signal and a measurement of an orthogonal frequency division multiplexing (OFDM) signal.

15. The method of claim 14, wherein:

the FMCW signal is transmitted by a first TRP and the OFDM signal is transmitted by a second TRP;

the FMCW signal is transmitted on a first subset of positioning reference signal (PRS) resources and the OFDM signal is transmitted on a second subset of the PRS resources;

the FMCW signal and the OFDM signal are time division multiplexed, space division multiplexed, or frequency division multiplexed with each other;

or a combination thereof.

16. A method of wireless positioning performed by a network entity, the method comprising:

identifying a set of transmission/reception points (TRPs) for transmitting frequency modulated continuous wave (FMCW) signals for a positioning measurement, wherein a FMCW signal comprises a signal that starts at a start frequency and changes its frequency over time until it reaches an end frequency, at which time the signal stops, the set comprising at least a first TRP and a second TRP;

receiving, from a user equipment (UE) that sends and receives orthogonal frequency division multiplexing (OFDM) signals, information identifying a capability of the UE to process FMCW signals; and sending, to the UE, information identifying the set of TRPs and identifying FMCW signals to be transmitted by each TRP in the set of TRPs.

17. The method of claim 16, wherein receiving the information identifying a capability of the UE to process FMCW signals comprises receiving at least one of:

an indication that the UE can or cannot process FMCW signals;

an indication of how many FMCW signals per TRP that the UE can support;

an indication of how many FMCW signals per resource set that the UE can support;

an indication that the UE can or cannot support both FMCW signals and OFDM signals in a same resource set;

an indication that the UE can or cannot support both FMCW signals and OFDM signals in a positioning reference signal (PRS) processing window;

an indication of processing time for FMCW signals; or an indication of processing time for OFDM signals.

18. The method of claim 16, further comprising:

receiving, from the UE, a first measurement of a first FMCW signal that was transmitted by the first TRP;

receiving, from the UE, a second measurement of a second FMCW signal that was transmitted by the second TRP; and determining a location of the UE based on the first measurement and the second measurement.

19. The method of claim 18, wherein the first measurement of the first FMCW signal comprises a first frequency of arrival, wherein the second measurement of the second FMCW comprises a second frequency of arrival, and wherein determining the location of the UE based on the first measurement and the second measurement comprises determining the location of the UE based on a frequency difference between the first frequency of arrival and the second frequency of arrival.

20. The method of claim 19, wherein determining the location of the UE based on the frequency difference between the first frequency of arrival and the second frequency of arrival comprises:

determining, based on the first frequency of arrival, a first range from the UE to the first TRP having a first range error based on a timing error between the UE and the first TRP;

determining, based on the second frequency of arrival, a second range from the UE to the second TRP having a second range error based on a timing error between the UE and the second TRP; and determining the location of the UE based on the first range and the second range.

21. The method of claim 20, wherein the positioning measurement comprises a frequency difference of arrival (FDOA) measurement and wherein determining the location of the UE based on the first range and the second range comprises:

determining a range difference between the first range from the UE to the first TRP and the second range from the UE to the second TRP; and determining the location of the UE based on the range difference between the first range from the UE to the first TRP and the second range from the UE to the second TRP.

22. The method of claim 21, wherein determining the range difference between the first range from the UE to the first TRP and the second range from the UE to the second TRP comprises calculating subtracting the second range from the first range, which cancels the first range error and the second range error and which produces the range difference between first range from the UE to the first TRP and the second range from the UE to the second TRP.

23. The method of claim 20, wherein the positioning measurement comprises a round trip time (RTT) measurement and wherein determining the location of the UE based on the first range and the second range comprises:

determining a range from the UE to the first TRP using a RTT calculation using the first range;

determining a range from the UE to the second TRP using a second RTT calculation using the second range; and determining the location of the UE based on the range from the UE to the first TRP and the range from the UE to the second TRP.

24. The method of claim 16, further comprising receiving, from the UE, at least one of:

information identifying a resource or resource set;

information identifying a set of one or more preferred TRPs;

a list of all of frequency components of at least one of the FMCW signals;

line-of-sight (LOS) or non-line-of-sight (NLOS) reporting;

frequency reference signal received power (RSRP) of at least one of the FMCW signals;

a time stamp of at least one of the FMCW signals; or a measurement quality of at least one of the FMCW signals.

25. The method of claim 16, wherein the positioning measurement comprises a frequency difference of arrival (FDOA) measurement, an angle of departure (AOD) measurement, an angle of arrival (AOA) measurement, a double-differential time difference of arrival (TDOA) measurement, a differential round-trip time (RTT) measurement, a double differential RTT measurement, or a combination thereof.

26. The method of claim 16, wherein the positioning measurement comprises a positioning measurement based on measurement of a FMCW signal and a measurement of an orthogonal frequency division multiplexing (OFDM) signal.

27. The method of claim 26, wherein:

the FMCW signal is transmitted by a first TRP and the OFDM signal is transmitted by a second TRP;

the FMCW signal is transmitted on a first subset of positioning reference signal (PRS) resources and the OFDM signal is transmitted on a second subset of the PRS resources;

the FMCW signal and the OFDM signal are time division multiplexed, space division multiplexed, or frequency division multiplexed with each other;

or a combination thereof.

28. The method of claim 16, wherein the network entity comprises a location server.

29. A user equipment (UE) that sends and receives orthogonal frequency division multiplexing (OFDM) signals, comprising:

a memory;

at least one transceiver; and at least one processor communicatively coupled to the memory and the at least one transceiver, the at least one processor configured to:

send, via the at least one transceiver, to a network entity, information identifying a capability of the UE to process frequency modulated continuous wave (FMCW) signals, wherein a FMCW signal comprises a signal that starts at a start frequency and changes its frequency over time until it reaches an end frequency, at which time the signal stops;

receive, via the at least one transceiver, from a network entity, information identifying a set of transmission/reception points (TRPs) for transmitting FMCW signals for a positioning measurement and identifying FMCW signals to be transmitted by each TRP in the set of TRPs, the set comprising at least a first TRP and a second TRP;

measure a first FMCW signal that was transmitted by the first TRP to determine a first frequency of arrival;

measure a second FMCW signal that was transmitted by the second TRP to determine a second frequency of arrival; and determine a location of the UE based on a frequency difference between the first frequency of arrival and the second frequency of arrival.

30. A network entity, comprising:

a memory;

at least one transceiver; and at least one processor communicatively coupled to the memory and the at least one transceiver, the at least one processor configured to:

identify a set of transmission/reception points (TRPs) for transmitting frequency modulated continuous wave (FMCW) signals for a positioning measurement, wherein a FMCW signal comprises a signal that starts at a start frequency and changes its frequency over time until it reaches an end frequency, at which time the signal stops, the set comprising at least a first TRP and a second TRP;

receive, via the at least one transceiver, from a user equipment (UE) that sends and receives orthogonal frequency division multiplexing (OFDM) signals, information identifying a capability of the UE to process FMCW signals; and send, via the at least one transceiver, to the UE, information identifying the set of TRPs and identifying FMCW signals to be transmitted by each TRP in the set of TRPs.

* * * * *